US012518754B1

United States Patent
Sriram et al.

(10) Patent No.: US 12,518,754 B1
(45) Date of Patent: Jan. 6, 2026

(54) STATE DETECTION AND RESPONSES FOR ELECTRONIC DEVICES

(71) Applicant: Amazon Technologies, Inc., Seattle, WA (US)

(72) Inventors: Vinay Kotikalapudi Sriram, Boyds, MD (US); William Evan Welbourne, Seattle, WA (US); Jay Patel, Seattle, WA (US); Sven Eberhardt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 449 days.

(21) Appl. No.: 18/088,898

(22) Filed: Dec. 27, 2022

Related U.S. Application Data

(63) Continuation of application No. 16/804,996, filed on Feb. 28, 2020, now Pat. No. 11,551,684, which is a
(Continued)

(51) Int. Cl.
*G06F 9/44* (2018.01)
*G06F 3/00* (2006.01)
(Continued)

(52) U.S. Cl.
CPC ............ *G10L 15/22* (2013.01); *G10L 15/30* (2013.01); *H04L 12/12* (2013.01); *G10L 2015/223* (2013.01)

(58) Field of Classification Search
None
See application file for complete search history.

(56) References Cited

U.S. PATENT DOCUMENTS 9,733,821 B2 * 8/2017 Fleizach ............... G06F 3/0487
10,580,407 B1 * 3/2020 Sriram .................... G10L 15/30
(Continued)

FOREIGN PATENT DOCUMENTS

CN         105898043 A  *  8/2016   ........ H04M 1/72454

OTHER PUBLICATIONS

Office Action for U.S. Appl. No. 16/804,996, mailed Apr. 15, 2022, Sriram, "State Detection and Responses for Electronic Devices", 12 pages.
(Continued)

*Primary Examiner* — Shreyans A Patel
(74) *Attorney, Agent, or Firm* — Nicholson De Vos Webster & Elliott LLP

(57) ABSTRACT

This disclosure describes, in part, techniques for utilizing global models to generate local models for electronic devices in an environment, and techniques for utilizing the global models and/or the local models to provide notifications that are based on anomalies detected within the environment. For instance, a remote system may receive an identifier associated with an electronic device and identify a global model using the identifier. The remote system may then receive data indicating state changes of the electronic device and use the data and the global model to generate a local model associated with the electronic device. Using the global model and/or local model, the remote system can identify anomalies associated with the electronic device and, in response to identifying an anomaly, notify the user. The remote system can further cause the electronic device to change states after receiving a request from the user.

20 Claims, 11 Drawing Sheets

Related U.S. Application Data continuation of application No. 15/836,414, filed on Dec. 8, 2017, now Pat. No. 10,580,407.

(51) Int. Cl.
  *G10L 15/22* (2006.01)
  *G10L 15/30* (2013.01)
  *H04L 12/12* (2006.01)

(56) References Cited

U.S. PATENT DOCUMENTS

| | | | | |
|---|---|---|---|---|
| 11,551,684 B1* | 1/2023 | Sriram | ............... | G06F 3/167 |
| 2002/0040272 A1* | 4/2002 | Nagasaka | ........... | G01C 21/3629 |
| | | | | 701/431 |
| 2007/0237085 A1* | 10/2007 | Tirumalai | ............ | H04Q 3/0087 |
| | | | | 370/242 |
| 2013/0179698 A1* | 7/2013 | Woods | ............. | H04N 21/42209 |
| | | | | 713/300 |
| 2015/0052384 A1* | 2/2015 | Kokubo | .............. | G06F 11/2038 |
| | | | | 714/4.11 |
| 2015/0145643 A1* | 5/2015 | Fadell | ...................... | G07C 9/27 |
| | | | | 340/5.51 |
| 2015/0280934 A1* | 10/2015 | Fujiwara | ............. | H04L 12/2818 |
| | | | | 370/328 |
| 2016/0238402 A1* | 8/2016 | Mcgavran | .......... | G01C 21/3626 |
| 2017/0085678 A1* | 3/2017 | Babu | ..................... | H04L 67/306 |
| 2018/0091381 A1* | 3/2018 | McLaughlin | ....... | H04L 12/2823 |

OTHER PUBLICATIONS

Office Action for U.S. Appl. No. 15/836,414, mailed on Jul. 12, 2019, Sriram, "State Detection and Responses for Electronic Devices", 5 pages.

Office Action for U.S. Appl. No. 16/804,996, mailed on Jul. 12, 2021, Sriram, "State Detection and Responses for Electronic Devices", 12 pages.

\* cited by examiner

600

602 — RECEIVE FIRST DATA IDENTIFYING AN ELECTRONIC DEVICE

604 — RECEIVE SECOND DATA REPRESENTING A USE OF THE ELECTRONIC DEVICE

606 — ASSOCIATE A FIRST MODEL WITH THE ELECTRONIC DEVICE

608 — GENERATE A SECOND MODEL BASED AT LEAST IN PART ON THE FIRST MODEL AND THE SECOND DATA

702 ─ ASSOCIATE A MODEL WITH AN ELECTRONIC DEVICE

704 ─ DETERMINE THAT THE ELECTRONIC DEVICE IS IN A CURRENT STATE

706 ─ IDENTIFY AN ANOMALY ASSOCIATED WITH THE ELECTRONIC DEVICE USING THE MODEL

708 ─ DETERMINE TO OUTPUT A QUERY REGARDING THE ELECTRONIC DEVICE

710 ─ SEND DATA REPRESENTING THE QUERY

FIG. 7

STATE DETECTION AND RESPONSES FOR ELECTRONIC DEVICES

RELATED APPLICATIONS

This application is a continuation of and claims priority to U.S. patent application Ser. No. 16/804,996, filed Feb. 28, 2020, which is a continuation of U.S. patent application Ser. No. 15/836,414, filed Dec. 8, 2017, now U.S. Pat. No. 10,580,407, issued Mar. 3, 2020, the entire contents of which are incorporated herein by reference.

BACKGROUND

As the processing power available to devices and associated support services continues to increase, it has become practical to interact with users in new ways. In particular, it is becoming practical to interact with users through speech. Many devices are now capable of receiving and responding to voice commands, including personal computers, smartphones, tablet devices, media devices, entertainment devices, industrial systems, voice-based assistants, and so forth. In some instances, a user may interact with a device using such voice commands in order to cause the device to control another device, such as by powering on or powering off the other device.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 6 illustrates an example process for utilizing a global model associated with an electronic device to generate a local model associated with the electronic device.

FIG. 7 illustrates an example process for using a model to detect an anomaly associated with an electronic device.

DETAILED DESCRIPTION

Figure 1:
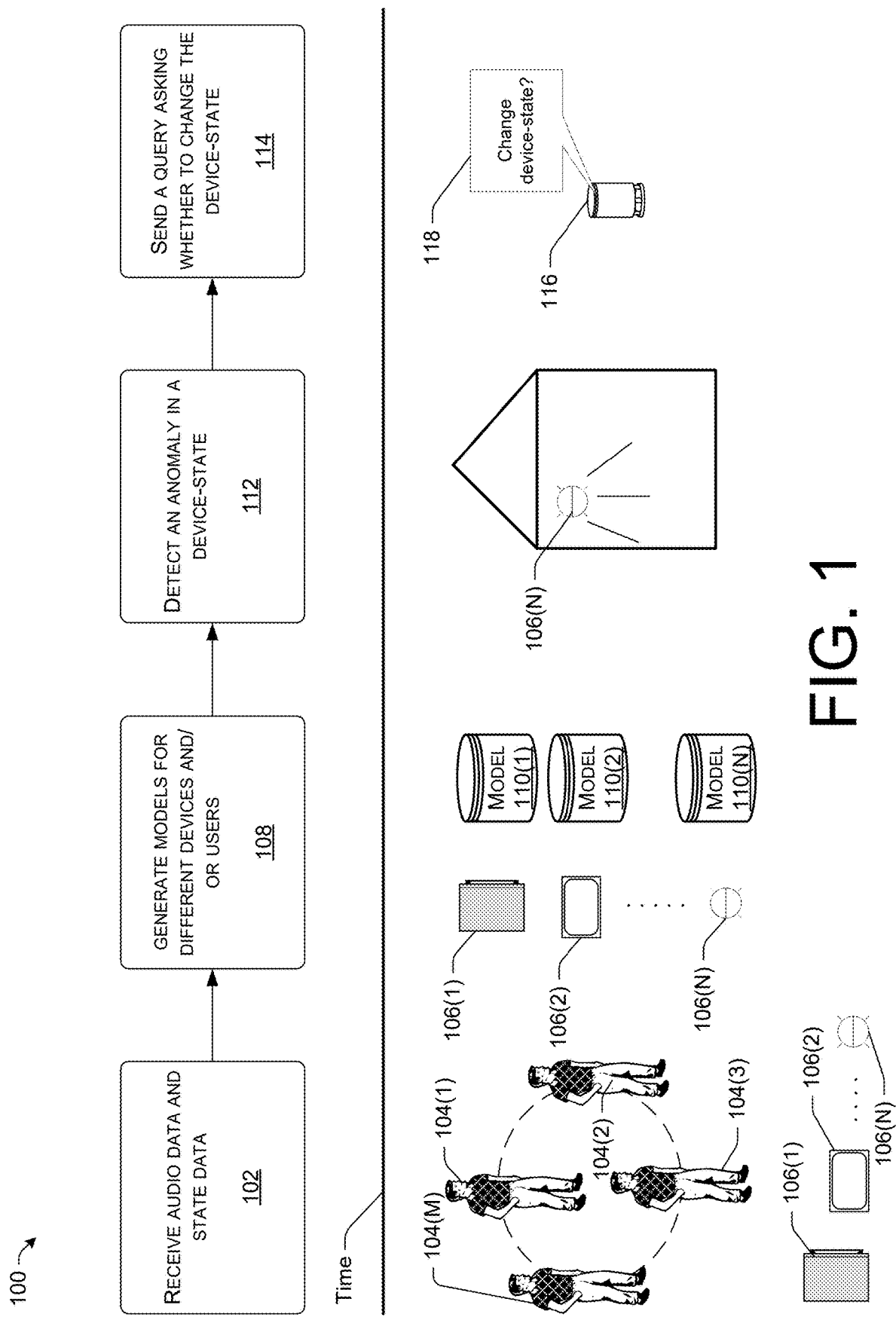
FIG. 1 is an example process for generating models for different devices and/or users and then using the models to detect an anomaly with a device.

This disclosure describes, in part, techniques for utilizing global models to generate local models for electronic devices in an environment, and techniques for utilizing the global models and/or the local models to provide notifications that are based on anomalies detected within the environment. For instance, a user may associate electronic devices located within an environment with functional identifiers (e.g., names and/or roles). The electronic devices may include televisions, set-top boxes, gaming counsels, smart light bulbs (referred to as simply "lights"), cameras (for, e.g., home, security, personal and/or active use), stereo components, alarm system sensors, temperature sensors, smart door locks, other home sensors, tablet computers, automobiles, lap top computers, desktop computers, home appliances (e.g., refrigerators, coffee machines, washing machines, oven, etc.), office appliances (e.g., printers, security access points, etc.), door types (e.g., garage door, back door, front door, etc.), sensors (e.g., living room thermometer, front door sensor, bedroom window sensor, front yard rain sensor, etc.), thermostats, vehicles (e.g., a microphones/speaker/Bluetooth combination within a user's car), or other electronic devices.

In some instances, the user may utilize a user device (e.g., mobile phone, computer, voice-controlled device, etc.) to associate each of the electronic devices with a respective functional identifier. For instance, the user may utilize the user device to connect each of the electronic devices to a remote system. To connect an electronic device to the remote system, the user may input information into the user device, such as an immutable identifier associated with the electronic device (e.g., a MAC address, IP address, etc.) and the functional identifier that the user desires to associate with the electronic device. The user device can then send data representing both the immutable identifier and the functional identifier to the remote system. The remote system can receive the data from the user device and store the immutable identifier in association with the functional identifier.

In some instances, the remote system can identify the type of electronic device and/or the role associated with the electronic device using the data. For example, the remote system may utilize the immutable identifier to identity the type of electronic device, such as a light, a refrigerator, an oven, or the like. For instance, the remote system may store database that associates immutable identifiers with electronic devices, and the remote system may use the database and the immutable identifier to identify the type of electronic device. For another example, the remote system may utilize the functional identifier to identify the type of electronic device. For instance, at least a portion of the functional identifier may include a word or phrases such as "light" or "oven", and the remote system can utilize the portion of the functional identifier to determine the type of electronic device.

Additionally, the remote system may utilize the functional identifier to determine a role for the electronic device. The role may represent functionality performed by the electronic device within the environment. For instance, the role may indicate an area within the environment that the electronic device is being utilized, such as the kitchen, bedroom, porch, or the like. Additionally, the role may indicate one or more times at which the electronic device is to be utilized, such as morning, day, night, or the like. To identify the role, the remote system may analyze the functional identifier to identify that a portion of the functional identifier, such as a word or phrase, indicates the role (e.g., includes "kitchen", "bedroom", "porch", "daytime", "nighttime" etc.).

For example, suppose that a user installed a new light in the kitchen of the environment. To set up the light, the user may utilize the user device (and/or any other device) to send data to the remote system that represents the immutable identifier and the functional identifier of the electronic device. Since the light is installed in the kitchen, the user may associate the light with the functional identifier "kitchen light." In response to receiving the data, the remote system may utilize the immutable identifier and/or the functional identifier to determine that the electronic device includes a "light". For example, the remote system may use the immutable identifier to search through the database that associates immutable identifiers to various electronic devices in order to determine the electronic device is a "light". For another example, the remote system may analyze the functional identifier to determine that a portion of the functional identifier indicates that the electronic device is a "light". Additionally, the remote system may analyze the functional identifier to determine that a portion of the functional identifier indicates that the electronic device is the "kitchen" light. In response, the remote system can determine that the role of the electronic device includes being a "kitchen" light within the environment.

In some instances, the remote system can utilize the functional identifiers to associate each of the electronic devices with a respective global model. For instance, the remote system may store, in at least one database, global models that are associated with various types of electronic devices and/or roles for electronic devices. For example, the remote system may store at least one global model for each of lights, ovens, refrigerators, televisions, and/or the like. For another example, the remote system may store at least one global model for each of kitchen lights, bedroom lights, porch lights, kitchen television, bedroom television, and/or the like. Thus, for each electronic device, the remote system may match the type of device and/or the role for the electronic device to the respective global model.

It should be noted that, in some instances, in addition to or alternatively from using the identifiers to identify the global models, the remote system may use local data that indicates actual usage of the electronic devices to associate each of the electronic devise with a respective global model. For instance, and as described in detail below, the local model associated with an electronic device may indicate at least times at which the electronic device is in an on-state, times at which the electronic device is in an off-state, various power levels associated with the electronic device, and/or the like. The remote system can then use the local data associated with the electronic device and/or the identifier to associate a global model with the electronic device. For example, if the identifier indicates that the electronic device is a light, the remote system can then determine a function of the light (e.g., bedroom light, porch light, etc.) based on the local data that indicates times at which the light is in the on-state and times at which the light is in the off-state. The remote system can then associate at least one global model with the electronic device. For another example, the remote system can determine the type of electronic device and the function of the light using the global data.

A global model may include one or more parameters that indicate one or more expected or common behaviors for an electronic device. For instance, the one or more parameters may indicate one or more times at which the particular type of electronic device is commonly in an on-state (e.g., powered on), one or more times at which the electronic device is commonly in an off-state (e.g., powered off), various power levels commonly utilized for the electronic device at one or more times, and/or the like. That is, the global models may indicate the typical usage of a particular type of electronic device based on data aggregated from multiple environments that include the device. For instance, a global model for a coffee maker may indicate that for a particular weekday it is commonly powered on at 6:15 a.m. local time (relative to the device), commonly turned off at 8:15 a.m. local time, and otherwise generally unused (e.g., powered off) during the remainder of the day.

The times can correspond to times of the day, week, month, year, and/or the like. To provide another example, a global model may indicate that an electronic device, such as a light, is expected to be powered on between 8:00 a.m. and 11:00 a.m., and expected to be powered off between 11:00 a.m. and 8:00 a.m. each day. To provide a second example, a global model may indicate that an electronic device, such as a light, is expected to be powered on between 800 a.m. and 10:00 a.m. on weekends (e.g., Saturdays and Sundays), and expected to be powered on between only 8:00 a.m. and 9:00 a.m. on weekdays (e.g., Mondays through Fridays). Additionally, the times can correspond to time durations, such as a minute, an hour, a day, and/or the like. For example, a global model may indicate that an oven is expected to be powered on for a duration of no more than two straight hours. Furthermore, and as used herein, a singular time can include an exact time, such as 8:00 p.m., or the singular time can include a time range, such as between 8:00 a.m. and 11:00 a.m. each day.

Additionally, or alternatively, in some instance, the one or more parameters can indicate correlations between the common behavior of the particular type of electronic device and the behavior of an additional electronic device within the environment. For example, the global model can indicate that a bedroom television is often powered on within a threshold time period (e.g., a minute, five minutes, etc.) after a bedroom light is powered on, and that the bedroom television is often powered off within a threshold time period after the bedroom light is powered off. For another example, the global model may indicate that the television is often powered on during times at which a motion detector detects motion within the environment.

In some instances, the remote system generates the global models using global data associated with various types of electronic devices and/or roles of the electronic devices, where the electronic devices are located in multiple environments. The global data can indicate different states of the electronic devices over a period of time. For instance, the global data can indicate times that the electronic devices are powered on (e.g., in an on-state, active, etc.), times that the electronic devices are powered off (e.g., an off-state, deactivated, etc.), times that the electronic devices transitioned from the on-state to the off-state, times that the electronic devices transitioned from the off-state to the on-state, various power levels of the electronic devices at different times, and/or the like. Additionally, or alternatively, in some instances, the global data can include audio data representing utterances of one or more users within the environments.

The utterances can correspond to requests to power on electronic devices, requests to power off the electronic device, requests to change power levels of the electronic devices, and/or the like.

In some instances, the global data can further include sensor data of one or more sensors located within the multiple environments. The sensors can include motion sensors, image sensors, window sensors, door sensors, and/or the like. For example, the sensor data associated with a motion sensor can indicate times at which the motion sensor detects motion within an environment. For a second example, the sensor data associated with a door sensor can indicate times at which a door is open and/or closed. Finally, for a third example, sensor data associated with an image device can indicate times at which the image device detects a user within the environment (and/or an identity of the detected user).

To generate a model using the global data, the remote system can identify a portion of the global data that is associated with a specific type of electronic device and/or role for the electronic device. The remote system can then analyze the portion of the global data using one or more machine-learning algorithms to determine times at which the electronic device was in the on-state, times at which the electronic device was in the off-state, times at which the electronic device was transitioned from the off-state to the on-state, times at which the electronic device was transitioned from the on-state to the off-state, various power levels associated with the electronic device at different times, and/or the like. The one or more machine-learning algorithms can then use the determinations to generate a global model that indicates expected behaviors for the electronic device.

Initially, in some instances, the remote system may utilize each of the global models associated with the respective electronic devices to identify anomalies within the environment. An anomaly can correspond to one of the electronic devices functioning differently than expected based on the global model associated with the electronic device. For example, an anomaly can include the electronic device being powered on at a time when the global model indicates that the expected behavior for the electronic device should be in an off-state. For a second example, an anomaly for an electronic device can include the electronic device being powered off at a time when the global model indicates that the expected behavior for the electronic device should be in an on-state. Finally, for a third example, an anomaly for an electronic device can include the electronic device operating at a first power level when the global model indicates that the electronic device is expected be operating at a second power level.

In some instances, the remote system can utilize one or more previous behaviors associated with an electronic device when identifying an anomaly. For example, the remote system may determine that the electronic device is currently in an on-state when the global model indicates that the expected behavior for the electronic device includes an off-state. Based on the determination, the remote system can then determine if the electronic device was powered on during a time period that the remote system expects the electronic device to be powered on using the global model. If the remote system determines that the electronic device was powered on during a time at which the remote system expected the electronic device to be powered on, according to the global model, then the remote system may determine that there is an anomaly with the electronic device. However, if the remote system determines that the electronic device was powered on during a time at which the remote system did not expect the electronic device to be powered on, according to the global model, then the remote system may determine that there is not an anomaly with the electronic device.

For example, a global model may indicate that an electronic device is expected to be powered on between 8:00 a.m. and 11:00 a.m., and expected to be powered off between 11:00 a.m. and 8:00 a.m. each day. If the remote system determines that the electronic device is in the on-state at 2:00 p.m., the remote system may identify a potential anomaly with the electronic device. In response, the remote system can determine if the electronic device was powered on between 8:00 a.m. and 11:00 a.m., as expected based on the global model. If the electronic device was powered on between 8:00 a.m. and 11:00 a.m., then the remote system may determine that the potential anomaly is an actual anomaly. However, if the electronic device was powered on between 11:00 a.m. and 8:00 a.m., which is not expected based on the global model, then the remote system may determine that the potential anomaly is not in fact an actual anomaly.

In some instances, the remote system can further utilize a confidence associated with the global model when identifying an anomaly. The confidence can correspond to a value that indicates how likely it is that the one or more parameters of the global model match the actual behavior of the electronic device within the environment. In some instances, since the global model is generated using data from other electronic devices (e.g., not the actual electronic device itself), the confidence may be low. In some instances, the remote system utilizes the confidence as a third criteria for determining if a potential anomaly is an actual anomaly.

For example, and using the example above where the global model indicates that the electronic device is expected to be powered on between 8:00 a.m. and 11:00 a.m., and expected to be powered off between 11:00 a.m. and 8:00 a.m. each day, the remote system may identify a potential anomaly with the electronic device if the electronic device is in the on-state at 2:00 p.m. Based on identifying the potential anomaly, the remote system can then determine if the electronic device was powered on between 8:00 a.m. and 10:00 a.m., as expected based on the global model. Additionally, the remote system can determine a confidence associated with the global model. The remote system can then determine if the potential anomaly is an actual anomaly based on the electronic device being in the on-state at 2:00 p.m. (e.g., first criteria), the electronic device being powered on between 8:00 a.m. and 11:00 a.am. (e.g., second criteria), and the confidence for the global model (criteria).

For example, the remote system may determine that the potential anomaly is an actual anomaly as long as the first two criteria are satisfied and the confidence associated with the global model is equal to or greater than a confidence threshold. For another example, the remote system may determine that the potential anomaly is not an actual anomaly if the first two criteria are satisfied and the confidence associated with the global model is below the confidence threshold. In some instances, the confidence threshold associated with the global model can include a value between 0 and 100, such as 50, 60, 90, or the like. In some instances, the confidence threshold associated with the global model can include a value between any other range of numbers. Additionally, in some instances, the confidence threshold associated with the global model can be specific to the type of device and/or role associated with the electronic device. For instance, the remote system may use a first confidence threshold for lights and a second confidence threshold for televisions.

Additionally, or alternatively, in some instances, the remote system can utilize confidence(s) that are associated with one or more times indicated by the global model. For example, the global model may indicate that, based on the global data, an electronic device is in the off-state at 8:00 p.m. 50% of the time and in the off-state at 9:00 p.m. 75% of the time. In such an example, the remote system may set a greater confidence (e.g., 75% confidence value) that the electronic device is expected to be in the off-state at 9:00 p.m. than the confidence (e.g., 50% confidence value) that the electronic device is expected to be in the off-state at 8:00 p.m. Additionally, in some instances, the remote system can update the confidence(s) associated with the one or more times indicated by the global model as the remote system continues to receive additionally global data.

For example, and using the example above where the global model indicates that the electronic device is expected to be powered on between 8:00 a.m. and 11:00 a.m., and expected to be powered off between 11:00 a.m. and 8:00 a.m. each day, the remote system may identify a potential anomaly with the electronic device if the electronic device is in the on-state at 2:00 p.m. Based on identifying the potential anomaly, the remote system can then determine if the electronic device was powered on between 8:00 a.m. and 10:00 a.m., as expected based on the global model. Additionally, the remote system can determine a confidence associated with the electronic device being in the on-state at 2:00 p.m. The remote system can then determine if the potential anomaly is an actual anomaly based on the electronic device being in the on-state at 2:00 p.m. (e.g., first criteria), the electronic device being powered on between 8:00 a.m. and 11:00 a.am. (e.g., second criteria), and the confidence for the electronic device being in the on-state at 2:00 p.m. (criteria).

For example, the remote system may determine that the potential anomaly is an actual anomaly as long as the first two criteria are satisfied and the confidence associated with the time is equal to or greater than a confidence threshold. For another example, the remote system may determine that the potential anomaly is not an actual anomaly if the first two criteria are satisfied and the confidence associated with the time is below the confidence threshold. In some instances, the confidence threshold associated with the time can include a value between 0 and 100, such as 50, 60, 90, or the like. In some instances, the confidence threshold associated with the time can include a value between any other range of numbers. Additionally, in some instances, the confidence threshold associated with the time can be specific to the type of device and/or role associated with the electronic device. For instance, the remote system may use a first confidence threshold for lights and a second confidence threshold for televisions.

In some instances, the remote system can take one or more actions based on detecting an anomaly with an electronic device. For instance, an action can include querying a user within the environment to determine whether to change the state of the electronic device. For example, the remote system can generate a query regarding whether to power off the electronic device. The remote system can then send first audio data representing the query to a local device, such as a voice-controlled device located in the environment of the user. The voice-controlled device can receive the first audio data from the remote system and, in response, output audio corresponding to the query. Additionally, the voice-controlled device can generate second audio data representing an utterance (e.g., user speech) from the user, where the utterance corresponds to the user requesting the remote system to power off the electronic device (e.g., "I would like the electronic device powered off"). The voice-controlled device can send the second audio data to the remote system, which can perform speech processing to determine an intent of the user. The remote system can then generate and send, to at least one of the electronic device or the voice-controlled device, an instruction that causes the electronic device to power off.

In some instances, the remote system may determine to change the state of the electronic device without sending the query to the user and/or without receiving a response from the user within a threshold amount of time. For instance, if the electronic device includes a specific type of electronic device, such as an oven that is powered on, the remote system may determine to power off the oven if the remote system does not receive a response from the user within a threshold amount of time, such as a minute, five minutes, and/or the like. Based on the determination, the remote system can generate and send, to at least one of the electronic device or the voice-controlled device, an instruction that causes the electronic device to power off.

In some instance, the remote system can generate local models associated with one or more of the electronic devices in the environment. For instance, the remote system can receive and store local data representing actual use (e.g., behaviors) of the electronic devices over time. In some instances, the local data can include local state data associated with the electronic devices, which can indicate times the electronic devices are powered on (e.g., in an on-state, active, etc.), times that the electronic devices are powered off (e.g., an off-state, deactivated, etc.), times that the electronic devices transitioned from the on-state to the off-state, times that the electronic devices transitioned from the off-state to the on-state, various power levels of the electronic devices at different times, and/or the like. Additionally, or alternatively, in some instances, the local data can include audio data representing utterances of one or more users within the environment. The utterances can correspond to requests to power on electronic devices, requests to power off the electronic device, requests to change power levels of the electronic devices, and/or the like.

The remote system can then use the global models for the electronic devise and the local data to generate the local models. For instance, the remote system can identify a portion of the local data that is associated an electronic device within the environment. The remote system can then analyze the portion of the local data using one or more machine-learning algorithms to determine times at which the electronic device was in the on-state, times at which the electronic device was in the off-state, times at which the electronic device was transitioned from the off-state to the on-state, times at which the electronic device was transitioned from the on-state to the off-state, various power levels associated with the electronic device at different times, and/or the like. The one or more machine-learning algorithms can then use the determinations to update the global model (e.g., update the parameters) associated with the electronic device. In some instance, the one or more machine-learning algorithms can continue this updating process as the remote system receives new local data associated with the electronic device.

The remote system can then use the local models associated with the electronic devices to identify anomalies within the environment, using a similar process as described above with regard to the global models. For instance, the remote system may determine that the electronic device is currently in an on-state when the local model indicates that the expected behavior for the electronic device includes an off-state. In response, the remote system can generate a query regarding whether to power off the electronic device and send first audio data representing the query to the voice-controlled device. The voice-controlled device can receive the first audio data from the remote system and, in response, output audio corresponding to the query. Additionally, the voice-controlled device can generate second audio data representing an utterance (e.g., user speech) from the user, where the utterance corresponds to the user requesting the remote system to power off the electronic device (e.g., "I would like the electronic device powered off"). The voice-controlled device can send the second audio data to the remote system, which can perform speech processing to determine an intent of the user. The remote system can then generate and send, to at least one of the electronic device or the voice-controlled device, an instruction that causes the electronic device to power off.

In some instances, since the local models are generated using local data that represents the actual use (e.g., behavior data) of the electronic devices within the environment, the remote system may assign higher confidences for the local models. Additionally, as the remote system continues to receive the local data associated with the electronic devices, and continues to update the local models (e.g., update the parameters of the local models) using the newly received local data, the remote system can continue to increase the confidence(s) of the local models. As such, in some instances, the remote system may be more likely to determine that a potential anomaly is an actual anomaly using the local models associated with the electronic devices than the global models associated with the electronic devices.

In some instances, the remote system can update confidence(s) associated with one or more times indicated by the local models using the local data. For example, if the percentage of time that an electronic device is in the on-state at a specific time increases over time using received local data, then the remote system may increase the confidence for the specific time. For another example, if the percentage of time that an electronic device is in the off-state at a specific time decreases over time using the received local data, then the remote system may decrease the confidence for the specific time.

Various machine learning techniques may be used to perform the training of models (sometimes labeled classifiers). Models may be trained and operated according to various machine learning techniques. Such techniques may include, for example, inference engines, trained classifiers, etc. Examples of trained classifiers include conditional random fields (CRF) classifiers, Bayesian classifiers, Support Vector Machines (SVMs), neural networks (such as deep neural networks and/or recurrent neural networks), decision trees, AdaBoost (short for "Adaptive Boosting") combined with decision trees, and random forests. Focusing on CRF as an example, CRF is a class of statistical models used for structured predictions. In particular, CRFs are a type of discriminative undirected probabilistic graphical models. A CRF can predict a class label for a sample while taking into account contextual information for the sample. CRFs may be used to encode known relationships between observations and construct consistent interpretations. A CRF model may thus be used to label or parse certain sequential data. Classifiers may issue a "score" indicating which category the data most closely matches. The score may provide an indication of how closely the data matches the category.

Additional or alternative techniques may be used to train the models, including backpropagation, statistical learning, supervised learning, semi-supervised learning, stochastic learning, stochastic gradient descent, or other known techniques. Further, while the training examples discussed above and below use data representing behavior of electronic devices, other training data may also be used. Thus, many different training examples may be used to train the machine learning models (classifiers) discussed herein. Further, as discussed above, as training data is added to, or otherwise changed, new models may be trained to update the models as desired. For instance, as the remote system continues to receive data representing the behavior of the electronic devices in the environment, the models may be re-trained to represent these behaviors.

After the models are trained, using the techniques described above and in further detail below, data collected and analyzed at runtime may trigger certain actions associated with the models. For instance, the models described above has been trained, the remote system described herein may identify, from data received from the electronic devices and/or voice-controlled devices, anomalies associated with the electronic devices within the environment. As such, the remote system may cause, in real-time or substantially real-time, the corresponding actions to occur, such as querying the user within the environment or changing the state of one or more of the electronic devices.

It should be noted that the description herein describes that models indicate the "expected" behavior of electronic devices. In some instances, a model may indicate an "expected" behavior based on the data indicating that the behavior occurs more than a threshold amount of time. For example, the model may indicate that the "expected" behavior for an electronic device is be in an on-state at a specific time during the day when the data indicates that the electronic device (and/or other similar electronic devices) are in the on-state more than fifty percent of the time at that specific time during the day. Additionally, the model may indicate that the "expected" behavior for the electronic device is to be in an off-state at a specific time during the day when the data indicates that the electronic device (and/or other similar electronic devices) are in the off-state from than fifty percent of the time at that specific time during the day.

In some instances, the "threshold amount of time" may be dependent on the state of the electronic device. For example, the model may indicate that the "expected" behavior for an electronic device is be in an on-state at a specific time during the day when the data indicates that the electronic device (and/or other similar electronic devices) are in the on-state more than seventy-five percent of the time at that specific time during the day. Additionally, the model may indicate that the "expected" behavior for the electronic device is to be in an off-state at a specific time during the day when the data indicates that the electronic device (and/or other similar electronic devices) are in the off-state from than twenty-five percent of the time at that specific time during the day.

Additionally, it should be noted that the remote system may refrain from using a portion of the audio data received from the voice-controlled devices when the remote system determines that the audio data is unreliable. For example, if the voice-controlled device continues to receive audio data representing utterances that request an electronic device to be powered on, without receiving audio data representing utterances that request the electronic device to be powered off, the remote system may determine that the audio data is unreliable. For instance, the remote system may determine that the user is manually powering off the electronic device and as such, it may be difficult for the remote system to determine the actual times at which the electronic device was in the on-state and in the off-state.

Furthermore, it should be noted that the remote system may send the audio data representing the query to the voice-controlled device in response to the remote system detecting that a user is proximate to the voice-controlled device. For instance, the remote system may receive, from the voice-controlled device, first audio data representing an utterance. The remote system can then analyze the audio data to determine an intent associated with the audio data. Additionally, the remote system can determine a response based on the intent. For example, if the utterance is asking "what is the weather today," the intent may include asking for the weather and the response may indicate the current weather. The remote system can then send second audio data to the voice-controlled device that represents the response. Additionally, the remote system may send third audio data to the voice-controlled device that represents the query.

Additionally, the remote system may determine that there is an anomaly with associated with an electronic device. In response, the remote system may generate a query asking if the remote system should transition the state of the electronic device based on the anomaly, and store the query. The remote system can then determine that the user is proximate to the voice-controlled device based on receiving the first audio data from the user and, in response, send the third audio data representing the query to the voice-controlled device.

In some instances, the remote system may determine that the user is proximate to the voice-controlled device using other techniques. For example, the voice-controlled device may generate audio data representing noise of the user walking in proximity to the voice-controlled device. The remote system can then use that audio data to determine that the user is proximate to the voice-controlled device. For another example, one or more sensors within the environment of the voice-controlled device may detect the motion of the user and send sensor data indicating the motion to the remote system.

Moreover, it should be noted that the examples described herein include sending "instructions" to electronic devices. As described herein, instructions can include messages, which can correspond to any type of electronic communication that electronic devices can send and receive with other electronic devices. For instance, a message can include an email message, a short message service (SMS), multimedia messages (MMS), a voicemail message, audio data, video data, or any other type of electronic communication that an electronic device can send to another electronic device. In some instances, an electronic device may use messages to send indications, notifications, alerts, and/or requests to another electronic device. Additionally, in some instances, an electronic device may use messages to instruct (i.e., cause) another electronic device to perform a function (e.g., power on, power off, change power level, etc.).

FIG. 1 is an example process 100 generating models for different devices and/or users and then using the models to detect an anomaly with a device. At 102, the process 100 receives audio data and state data. For instance, a system (illustrated in FIG. 2) may receive audio data representing utterances from various users 104(1)-(M). In some instances, the users 104(1) may be located in a single environment while in other instances, the users 104(1)-(M) may be located in multiple environments. The system may further receive state data associated with electronic devices 106(1)-(N), which can include time data indicating times the electronic devices 106(1)-(N) are powered on (e.g., in an on-state, active, etc.), times that the electronic devices 106(1)-(N) are powered off (e.g., an off-state, deactivated, etc.), times that the electronic devices 106(1)-(N) transitioned from the on-state to the off-state, times that the electronic devices 106(1)-(N) transitioned from the off-state to the on-state, various power levels of the electronic devices 106(1)-(N) at different times, and/or the like.

At 108, the process 100 generates models for different devices and/or users. For instance, the system can use the audio data and the state data to generate model 110(1)-(N) for the different electronic devices 106(1)-(N). For example, the system may generate a first model 110(1) for the first electronic device 106(1), a second model 110(2) for the second electronic device 110(2), and a third model 110(N) for the third electronic device 106(N). The respective model 110(1)-N) associated with each electronic device 106(1)-(N) may indicate at least times at which the electronic device 106(1)-(N) is in an on-state, times at which the electronic device 106(1)-(N) is in an off-state, various power levels associated with the electronic device 106(1)-(N), and/or the like. In some instances, the models 110(1)-N) include global models that are generated using some or all of the received audio data and state data from the respective electronic devices 106(1)-N). Additionally, or alternatively, in some instances, the models 110(1)-N) include local models that are generated using audio data and state data that is specific to an electronic device 106(1)-N), as described in detail below.

At 112, the process 100 detects an anomaly in a device-state. For instance, the system may receive data (e.g., audio data, state data, etc.) indicating a current state of the electronic device 106(N) which, in the example process 100 of FIG. 1, may include a light. For example, the data may indicate that the electronic device 106(N) is currently in the on-state at a time that the device 106(N) is expected to be in the off-state. For instance, the system may utilize the model 110(N) associated with the electronic device 106(N) to detect this anomaly for the current time-of-day.

At 114, the process 100 sends a query asking whether to change the device-state. For instance, based on detecting the anomaly, the system may generate audio data representing a query that asks whether the system should change the device-state of the electronic device 106(N) from the on-state to the off-state. The system can then send the audio data representing the query to a voice-controlled device 116 that is associated with the electronic device 106(N) and/or an environment that includes the electronic device 106(N). In response, the voice-controlled device 116 can receive the audio data from the system and output audio 118 representing the query. For example, the voice-controlled device 116 can output audio 118 requesting whether to change the device-state of the electronic device 106(N).

In some instances, the system can then receive additional audio data from the voice-controlled device 116 that represents an utterance from the user, where the utterance indicates that the user wants the system to change the device-state of the electronic device 106(N). In response, the system can generate and send an instruction that causes the electronic device 116 to change the device-state. For example, the electronic device 106(N) may transition from the on-state (as represented in the example process 100 of FIG. 1) to the off-state based on receiving the instruction.

Figure 2:
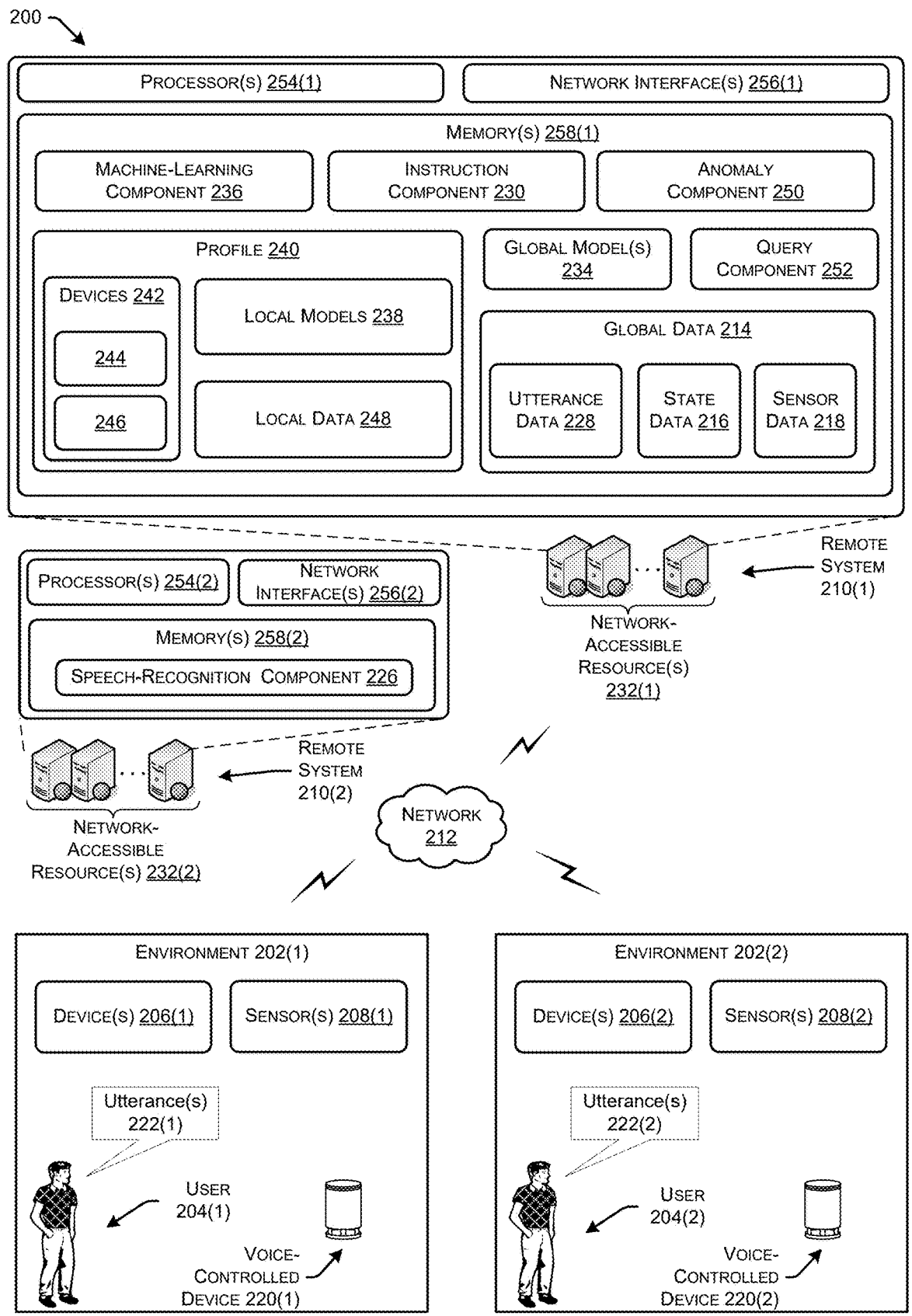
FIG. 2 is a schematic diagram of a remote system receiving data representing behavior of electronic devices in various environments and generating global models using the data.

FIG. 2 is a schematic diagram of an illustrative architecture 200 that includes environments 202(1)-(2) associated respectively with users 204(1)-(2), with each of the environments 202(1)-(2) including respective electronic device(s) 206(1)-(2) and respective sensor(s) 208(1)-(2). As described herein, electronic devices (e.g., electronic device(s) 206(1)-(2)) may include televisions, set-top boxes, gaming counsels, smart light bulbs (referred to as just lights), cameras (for, e.g., home, security, personal and/or active use), stereo components, alarm system sensors, temperature sensors, smart door locks, other home sensors, tablet computers, automobiles, lap top computers, desktop computers, home appliances (e.g., refrigerators, coffee machines, washing machines, oven, etc.), office appliances (e.g., printers, security access points, etc.), door types (e.g., garage door, back door, front door, etc.), sensors (e.g., living room thermometer, front door sensor, bedroom window sensor, front yard rain sensor, etc.), thermostats, vehicles (e.g., a microphones/speaker/Bluetooth combination within a user's car), or other electronic devices. Additionally, the sensor(s) 208(1)-(2) may include motion sensors, image sensors (e.g., cameras), door sensors, window sensors, or the like.

The electronic device(s) 206(1)-(2) may collect data that indicates one or more states associated with the electronic device(s) 206(1)-(2). For instance, the data can indicate times the electronic device(s) 206(1)-(2) are powered on (e.g., in an on-state, active, etc.), times that the electronic device(s) 206(1)-(2) are powered off (e.g., an off-state, deactivated, etc.), times that the electronic device(s) 206(1)-(2) transitioned from the on-state to the off-state (e.g., were manually switched from the on-state to the off-state, received an instruction that caused the transition from the on-state-to the off-state, etc.), times that the electronic device(s) 206(1)-(2) transitioned from the off-state to the on-state (e.g., were manually switched from the off-state to the on-state, received an instruction that caused the transition from the off-state-to the on-state, etc.), various power levels of the electronic device(s) 206(1)-(2) at different times, and/or the like. The electronic device(s) 206(1)-(2) can then send the data to a remote system over a network 212, such as the remote system 210(1), which can store the data as global data 214, which is represented in FIG. 2 as state data 216.

The sensor(s) 208(1)-(2) may collect sensor data associated with the sensor(s) 208(1)-(2). For example, a motion senor may collect sensor data indicating times at which the motion sensor detects motion within an environment. Additionally, an image device may collect sensor data corresponding to image data captured within an environment. Furthermore, a door sensor may capture sensor data indicating times at which a door is opened and/or times at which the door is closed. Moreover, a window sensor may capture sensor data indicate times at which a window is open and/or times at which the window is closed. The sensor(s) 206(1)-(2) can then send the sensor data to the remote system 210(1) over the network 212, which can store the data as global data 214, which is represented as sensor data 218.

Additionally, each of the environments 202(1)-(2) can respectively include at least one voice-controlled device 220(1)-(2). Each of the voice-controlled devices 220(1)-(2) may generate audio data based on sound detected within the respective environment 202(1)-(2), with the audio data representing at least respective utterance(s) 222(1)-(2) from one of the users 204(10-(2). In some instances, the utterance(s) 222(1)-(2) correspond to voice commands to control various electronic device(s) 206(1)-(2). For example, the utterance(s) 222(1) may correspond to commands to power on electronic device(s) 206(1), power off electronic device(s) 206(1), change a power level associated with the electronic device(s) 206(1), and/or the like. For another example, the utterance(s) 222(2) may correspond to commands to power on electronic device(s) 206(2), power off electronic device(s) 260(2), change a power level associated with the electronic device(s) 206(2), and/or the like.

In response to generating this audio data, the voice-controlled devices 220(1)-(2) may perform speech recognition on the audio data to identify the voice command or may send the audio data to the remote system 210(1) and/or the remote system 210(2). Upon receiving the audio data, the remote system 210(1) and/or the remote system 210(2) may then analyze the audio data to determine that the intent of the voice command is to change a state of an electronic device 206(1)-(2) and, in response, store the audio data as global data 214, which is represented by utterance data 228. Additionally, the remote system 210(1) may cause the electronic device(s) 206(1)-(2) to perform a function that is based on the voice command. For instance, the remote system 210(1) may utilize an instruction component 230 to generate and send the electronic device(s) 206(1)-(2) instructions that cause the electronic device(s) 206(1)-(2) to power on, power off, change a power level, and/or the like.

The remote system 210(1), which comprises one or more network resources or devices 232(1), uses the global data 214 to generate and train global model(s) 234 for various types of electronic devices (e.g., electronic device(s) 206(1)-(2)) and/or roles for the electronic devices. For example, the remote system 210(1) may generate and store at least one global model 234 for each of lights, ovens, refrigerators, televisions, and/or the like. For another example, the remote system 210(1) may generate and store at least one global model 234 for each of kitchen lights, bedroom lights, porch lights, kitchen television, bedroom television, and/or the like.

The remote system 210(2), which may comprise one or more network resources or devices 232(2), can analyze audio data received from the voice-controlled devices 220(1)-(2) in order to determine an intent associated with utterance(s) 222(1)-(2). In some instances, the remote system 210(2) can then communicate (e.g., utilize a command processor 958) with the remote system 210(1) when the intent is related to controlling device(s) 206(1)-(2). For instance, the remote system 210(2) can (e.g., utilize a command processor 958) send the remote system 210(2) the audio data, generated text data that is associated with the audio data, an indication of the intent, and/or the like. Additionally, the remote system 210(1) can communicate (e.g., utilize a command processor 958) with the remote system 210(2) when sending audio data back to the voice-controlled devices 220(1)-(2). For instance, the remote system 210(1) can (e.g., utilize a command processor 958) send the remote system 210(2) data, such as text (e.g., a query, response, etc.), which the remote system 210(2) can use to generate audio data representing the text. The remote system 210(2) can then send the generated audio data to the voice-controlled devices 220(1)-(2).

In some instances, the remote system 210(1) and the remote system 210(2) may be combined into a single system. For instance, the remote system 210(2) may include one or more of the components (reference characters 226 and 902-968) of, and may be configured to perform some or all of the processes of, the remote system 210(2).

To generate and train a global model 234 using the global data 214, the remote system 210(1) can utilize the machine-learning component 236 (e.g., a data component). For example, as illustrated in FIG. 2, the machine-learning component 236 uses utterance data 228, state data 216, and/or sensor data 218 to generate the global models 234. For example, as discussed above, the utterance data 228 can include a history of utterance(s) 222(1) from the user 204(1) and/or a history of utterance(s) 222(2) from the user 204(2), where the history of utterance(s) 222(1) is associated with changing a state of the electronic device(s) 206(1) and the history of utterance 222(2) is associated with changing the state of the electronic device(s) 206(2). The state data 216 can include a history of state changes associated with the electronic device(s) 206(1) and/or a history of state changes associated with the electronic device(s) 206(2). Furthermore, the sensor data 218 can indicate a history of sensor activity generated by the sensor(s) 208(1) and/or a history of sensor activity generated by the sensor(s) 208(2). In some examples, as the remote system 210(1) continues to receive new global data 214 (e.g., audio data representing utterances 222(1)-(2), state data indicating the state changes associated with the electronic device(s) 206(1)-(2), and sensor data indicating the sensor activity of sensor(s) 208(1)-(2)) and update the utterance data 228, the state data 216, and/or the sensor data 218. For instance, each time the remote system 210(1) receives audio data representing an utterance 222(1)-(2) from a user 204(1)-(2), the remote system 210(1) can store the audio data as utterance data 228. Additionally, each time the remote system 210(1) receives data indicating a device-state of one of the electronic device(s) 206(1)-(2), the remote system 210(1) can store the data as state data 216. Furthermore, each time the remote system 210(1) receives sensor data from one of the sensors 208(1)-(2), the remote system 210(1) can store the sensor data as sensor data 218.

In some instances, to generate global model(s) 234, the machine-learning component 236 can identify a portion of the global data 214 that is associated with a specific type of electronic device and/or role for the electronic device. The machine-learning component 236 can then analyze the portion of the global data 214 using one or more machine-learning algorithms (described above) to determine times at which the electronic device was in the on-state, times at which the electronic device was in the off-state, times at which the electronic device was transitioned from the off-state to the on-state, times at which the electronic device was transitioned from the on-state to the off-state, various power levels associated with the electronic device at different times, and/or the like. The machine-learning component 236 can then use the one or more machine-learning algorithms, along with the determinations, to generate a global model 234 that indicates expected behaviors for the electronic device.

In some examples, a global model 234 can represent data structure that includes data indicating times at which the electronic device is expected to be in the on-state, times at which the electronic device is expected to be in the off-state, times at which the electronic device is expected to transition from the off-state to the on-state, times at which the electronic device is expected to transition from the on-state to the off-state, expected power levels associated with the electronic device at different times, and/or the like. The machine-learning component 236 can generate the data of the data structure using the global data 214 that is associated with the electronic device. For instance, the machine learning-component 236 can generate data indicating the times at which the electronic device is expected to be in the on-state, times at which the electronic device is expected to be in the off-state, times at which the electronic device is expected to transition from the off-state to the on-state, times at which the electronic device is expected to transition from the on-state to the off-state, expected power levels associated with the electronic device at different times, and/or the like based on the global data 214 which indicates the actual use of the electronic device within multiple environments.

In some instances, the machine-learning component 236 can further correlate the sensor data from the sensor(s) 208(1)-(2) with the identified portion of the global data 214 that is associated with each type of electronic device and/or role for the electronic device when generating the global models 234. For example, the machine-learning component 236 can determine that a state of an electronic device 206(1)-(2) transitions each time a sensor 208(1)-(2) detects a user within the environment 208(1)-(2). For example, the machine-learning component 236 can determine that a light transitions from an off-state to an on-state each time a motion sensor detects motion within an environment, and transitions from the on-state to the off-state each time the motion sensor is no longer detecting motion. The machine-learning component 236 can then use that correlation when generating a global model 234 for the light.

A global model 234 may include one or more parameters that indicate an expected behavior for an electronic device. For instance, the global model 234 may indicate one or more times at which the electronic device is expected to be in an on-state (e.g., powered on), one or more times at which the electronic device is expected to be in an off-state (e.g., powered off), one or more times at which the electronic device is expected to transition from the off-state to the on-state, one or more times at which the electronic device is expected to transition from the off-state to the on-state, various power levels expected for the electronic device at one or more times, and/or the like. The times can correspond to times of the day, week, month, year, and/or the like. For example, a global model 234 may indicate that an electronic device is expected to be powered on between 8:00 a.m. and 11:00 a.m., and expected to be powered off between 11:00 a.m. and 8:00 a.m. each day. For another example, a global model 234 can indicate that an electronic device is expected to be powered on between 8:00 a.m. and 10:00 a.m. every Sunday. Additionally, the times can correspond to time durations, such as a minute, an hour, a day, and/or the like. For example, a global model 234 may indicate that an oven is expected to be powered on for a duration of no more than two straight hours. Furthermore, and as used herein, a singular time can include an exact time, such as 8:00 p.m., or the singular time can include a time range, such as between 8:00 a.m. and 11:00 a.m. each day.

Additionally, or alternatively, in some instance, the one or more parameters can indicate correlations between the expected behavior of the electronic device and the behavior of an additional electronic device and/or the sensors within the environment. For example, the global model 234 can indicate that the bedroom television is expected to powered on within a threshold time period (e.g., a minute, five minutes, etc.) after the bedroom light is powered on, and that the bedroom television is expected to be powered off within a threshold time period after the bedroom is powered off. For another example, a global model 234 may indicate that the television is expected to be powered on during times at which a motion detector detects motion within the environment.

In some instances, the remote system 210(1) can continue to receive additional global data 214 from the electronic device(s) 106(1)-(2) and/or the voice-controlled devices 116(1)-(2). The remote system 210(1) can then use the additional global data 214 to further train the global models 234. For instance, the machine-learning component 236 can continue to use the one or more machine-learning algorithms to update the one more parameters of the global models 234 using the additional global data 214.

In some instances, and as described in further detail below, the machine-learning component 236 can use the global model(s) 234 to generate local models 238 for specific electronic devices within an environment. For instance, the remote system 210(1) may generate a profile 240 for the user 204(1) and/or the environment 202(1) (and/or also generate, using similar processes, a profile for the user 204(2) and/or the environment 202(2)). The profile 240 may store device identifier data 242 each of the electronic device(s) 206(1) that are associated with the user 204(1). The device identifier data 242 may include an immutable identifier 244 associated with each of the electronic device(s) 206(1) and a functional identifier 246 associated with each of the electronic device(s) 206(1). The machine-learning component 236 can then generate a respective local model 234 for each of the electronic device(s) 206(1) using at least one global model 234 and local data 248 that is associated with the respective device 206(1).

For instance, the remote system 210(1) can receive and store the local data 248 representing behaviors of the electronic device(s) 206(1). The local data 248 for an electronic device 206(1) may represent the portion of the global data 214 that is associated with the device 206(1). For instance, the local data 248 can indicate various states of the electronic device 206(1), such as times the electronic device 206(1) is powered on (e.g., in an on-state, active, etc.), times that the electronic device 206(1) is powered off (e.g., an off-state, deactivated, etc.), times that the electronic device 206(1) transitioned from the on-state to the off-state, times that the electronic device 206(1) transitioned from the off-state to the on-state, various power levels of the electronic device 206(1) at different times, and/or the like.

Additionally, or alternatively, in some instances, the local data 248 can include audio data representing utterances of the user 204(1) (and/or other users) within the environment 202(1). The utterances can correspond to requests to power on electronic device 206(1), requests to power off the electronic device 206(1), requests to change power levels of the electronic device 206(1), and/or the like. The remote system 210(1) can then use the utterances to determine the times at which the electronic devices 206(1) is powered on (e.g., in an on-state, active, etc.), times at which the electronic devices 206(1) is powered off (e.g., an off-state, deactivated, etc.), times at which the device 206(1) transitioned from the on-state to the off-state, times at which the electronic device 206(1) transitioned from the off-state to the on-state, various power levels of the electronic device 206(1) at different times, and/or the like. For example, if the remote system 210(1) receives first audio data representing a first request to power on the electronic device 206(1) at 10:00 a.m., and second audio data representing a second request to power off the electronic device 206(1) at 11:00 a.m., then the remote system 210(1) can determine that the electronic device 206(1) was in the on-state between 10:00 a.m. and 11:00 a.m.

Additionally, or alternatively, the local data 248 can include sensor data associated with the sensor(s) 208(1). For example, as discussed above, a motion senor may collect sensor data indicating times at which the motion sensor detects motion within an environment. Additionally, an image data may collect sensor data corresponding to image data captured within an environment. Furthermore, a door sensor may capture sensor data indicating times at which a door is opened and/or times at which the door is closed. Moreover, a window sensor may capture sensor data indicate times at which a window is open and/or times at which the window is closed. The sensor(s) 208(1) can then send the sensor data to the remote system 210(1) over the network 212, which can store the sensor data as local data 248.

The remote system 210(1) can then use the global models 234 for the electronic devise(s) 206(1) and the local data 248 to generate the local models 238. For instance, the remote system 210(1) can identify a respective global model 234 for each device 206(1) using the devices data 242 and the local data 248. To identify a global model 234, the remote system 210(1) can use the immutable identifier 244 and/or the functional identifier 246 to identify one or more global models 234 that match the electronic device 206(1). For instance, the remote system 210(1) can identify a type of electronic device 206(1) using the immutable identifier 244 and/or functional identifier 246, such as light, oven, television, etc. The remote system 210(1) can then identify one or more global models 234 that match the type of device. For instance, if the electronic device 206(1) includes a light, the remote system 210(1) can identify one or more global models 234 that are associated with lights.

In some instances, the remote system 210(1) can further utilize the local data 248 when identifying the global models 234. For instance, a first global model 234 may indicate first times that an electronic device is expected to be in the on-state and second times that the electronic device is expected to be in the off-state. Additionally, a second global model 234 may indicate third times that an electronic device is expected to be in the on-state and fourth times that the electronic device is expected to be in the off-state. If the local data 248 for the electronic device 206(1) indicates that the electronic device 206(1) is usually in the on-state during the first times and in the off-state during the third times, then the remote system 210(1) may associated the first global model 234 with the electronic device 206(1) based on the actual behavior of the electronic device 206(1) more closely matching the first global model 234.

The remote system 210(1) can then use the global models 234 to generate the local models 238 for the electronic device 206(1). For instance, to generate a local model 238, the remote system 210(1) can utilize the machine-learning component 236 to identify a portion of the local data 238 that corresponds to an electronic device 206(1). In some instances, the portion of the local data 248 can include data that the remote system 210(1) receives from the electronic device 206(1). Additionally, or alternatively, in some instances, the portion of the local data 248 can include audio data that the remote system 210(1) receives from the voice-controlled device 220(1), where the audio data represents one or more requests associated with the electronic device 206(1). For example, the requests can include requests to power on the device 206(1), requests to power off the electronic device 206(1), requests to change a power level associated with the electronic device 206(1), and/or the like.

The machine-learning component 236 can then analyze the portion of the local data 248 using one or more machine-learning algorithms to determine times at which the electronic device 206(1) was in the on-state, times at which the electronic device 206(1) was in the off-state, times at which the electronic device 206(1) was switched from the off-state to the on-state, times at which the electronic device 206(1) was switched from the on-state to the off-state, various power levels associated with the electronic device 208(5) at different times, and/or the like. The machine-learning component 236 can then use the one or more machine-learning algorithms to generate the local model 238 associated with the electronic device 206(1) by updating the one or more parameters of the global model 234 based on the determinations. In some instance, the machine-learning component 236 can continue to use the one or more machine-learning algorithms to update the local model 238 as the remote system 210(1) continues to receive new local data 238 associated with the electronic device 206(1).

For instance, the local model 238 associated with the electronic device 206(1) may include one or more parameters that indicate one or more times at which the electronic device 206(1) is expected to be in an on-state (e.g., powered on), one or more times at which the electronic device 206(1) is expected to be in an off-state (e.g., powered off), one or more times at which the electronic device 206(1) is expected to transition from the off-state to the on-state, one or more times at which the electronic device 206(1) is expected to transition from the off-state to the on-state, various power levels expected for the electronic device 206(1) at one or more times, and/or the like.

The remote system 210(1) can then use the local models 238 associated with the electronic device 206(1) to identify anomalies within the environment 202(1). For example, the remote system 210(1) can utilize an anomaly component 250 to identify anomalies within the environment 202(1) based on the local models 238, which is described in detail below. Based on identifying an anomaly, the remote system 210(1) can utilize the query component 252 to generate and send a query to the user 204(1), where the query includes a request to change the current state of the electronic device 206(1) for which the anomaly was detected, which is also described in detail below.

As further illustrated in FIG. 2, the remote system 210(1) includes processor(s) 254(1), network interface(s) 256(1), and memory(s) 258(1). Additionally, the remote system 210(2) includes processor(s) 254(2), network interface(s) 256(2), and memory(s) 258(2). As used herein, processor(s) may include multiple processors and/or a processor having multiple cores. Further, the processor(s) may comprise one or more cores of different types. For example, the processor(s) may include application processor units, graphic processing units, and so forth. In one implementation, the processor may comprise a microcontroller.

Additionally, memory (e.g., memory(s) 258(1) and memory(s) 258(2)) may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Furthermore, network interface(s) (e.g., network interface(s) 256(1) and network interface(s) 256(2)) may include a personal area network (PAN) component to enable communications over one or more short-range wireless communication channels. For instance, the PAN component may enable communications compliant with at least one of the following standards IEEE 902.15.4 (ZigBee), IEEE 902.15.1 (Bluetooth), IEEE 902.11 (WiFi), or any other PAN communication protocol. Furthermore, network interface(s) may include a wide area network (WAN) component to enable communication over a wide area network.

Moreover, the network 212 may represent an array or wired networks, wireless networks (e.g., WiFi), or combinations thereof. The remote system 210(1) may generally refer to a network-accessible platform—or "cloud-based service"—implemented as a computing infrastructure of processors, storage, software, data access, and so forth that is maintained and accessible via the network 212, such as the Internet. Common expressions associated with cloud-based services, such as the remote system 210(1), include "on-demand computing", "software as a service (SaaS)", "platform computing", "network accessible platform", and so forth.

Figure 3:
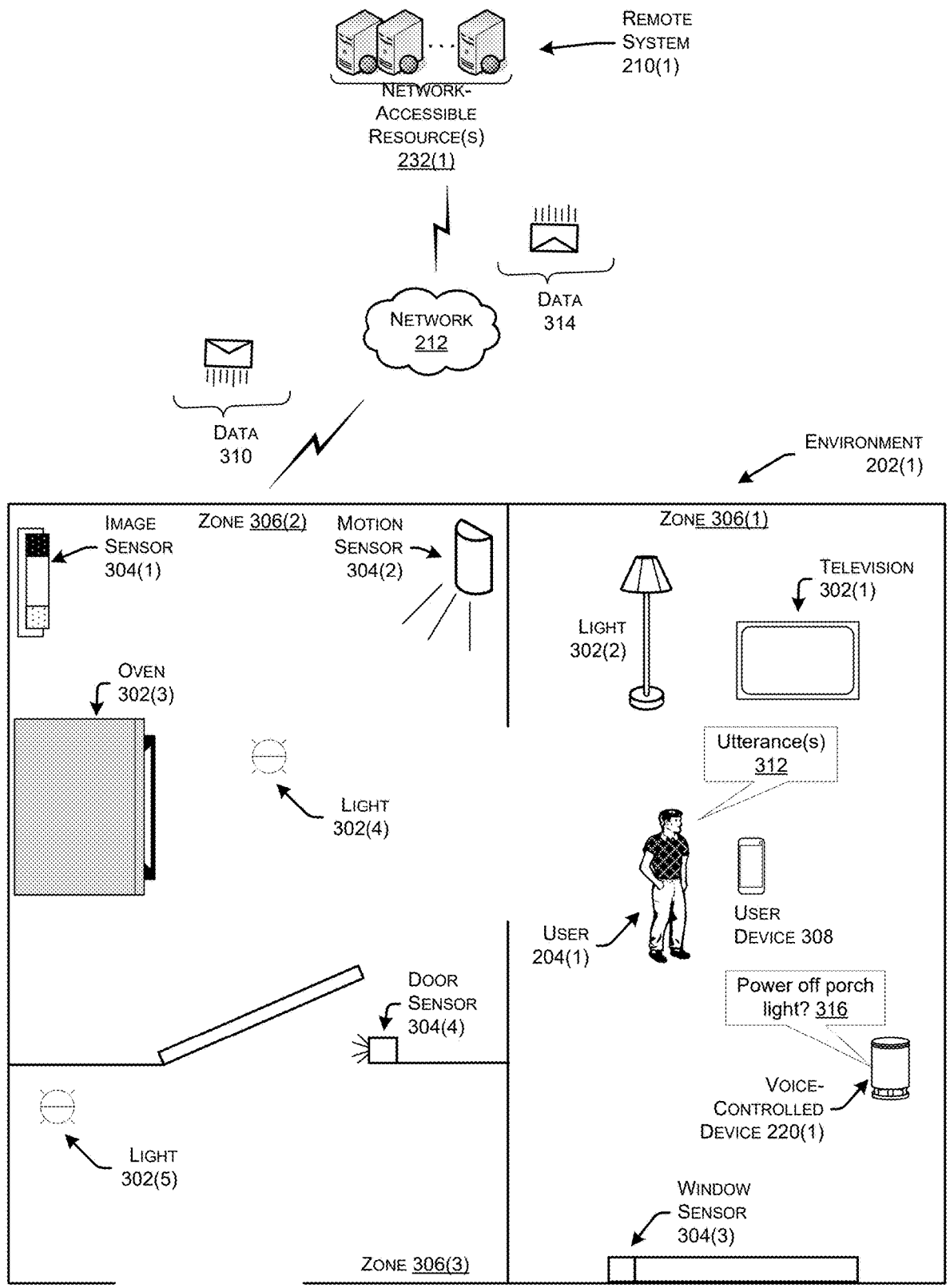
FIG. 3 is an example of using global models and local models to monitor various electronic devices within the environment. Based on the monitoring, the remote system identifies anomalies within the environment and sends notifications to a user.

FIG. 3 is an example that includes the environment 202(1) associated with the user 204(1), with the environment 202(1) including various electronic device 302(1)-(5) (which may correspond to electronic device(s) 206(1)) and sensors 304(1)-(4) (which may correspond to sensor(s) 208(1)). In the example of FIG. 3, the user 204(1) may initially install the electronic devices 302(1)-(5) within various zones 306(1)-(3) of the environment 202. For instance, the user may install a television 302(1) and a first light 302(2) in a first zone 306(1) (e.g., a living room), install an oven 302(3) and a second light 302(4) in a second zone 306(2) (e.g., a kitchen), and install a third light 302(5) in a third zone 306(3) (e.g., a porch area).

To initially install each electronic device 302(1)-(5), the user 204(1) may utilize a user device 308 (and/or a voice-controlled device 220(1)) to connect each of the electronic devices 302(1)-(5) within the environment 202 to the remote system 210(1). For instance, and using the electronic device 302(5) as an example, the user 204(1) may input information into the user device 308, such as an immutable identifier associated with the electronic device 302(5) (e.g., a MAC address, IP address, etc.) and the functional identifier (e.g., "zone 306(3) light") that the user 204(1) desires to associate with the electronic device 302(5). The user device 308 can then send data representing both the immutable identifier and the functional identifier to the remote system 210(1). The remote system 210(1) can receive the data from the user device 212 and store the immutable identifier in association with the functional identifier. For instance, as was illustrated in FIG. 2, each of the data 242 for the electronic devices 302(1)-(5) includes immutable identifiers 244 and functional identifiers 246.

In some instances, the remote system 210(1) can identify a respective type and/or role associated with each of the electronic devices 302(1)-(5) using the received data. For example, and again using the electronic device 302(5) as an example, the remote system 210(1) may utilize the immutable identifier 244 to identity the type of electronic device, such as a light. For instance, the remote system 210(1) may utilize a table and/or other database that matches immutable identifiers to electronic devices in order to identify the type of device. For another example, the remote system 210(1) may utilize the functional identifier 246 to identify the type of electronic device. For instance, at least a portion of the functional identifier may include a word or phrases such as "light", and the remote system 210(1) can utilize the portion of the functional identifier 246 to determine the type of electronic device. Additionally, the remote system 210(1) may utilize the functional identifier 246 to determine a role for the electronic device 302(5). As discussed above, the role may represent functionality performed by the electronic device 302(5) within the environment 202(1). For instance, with regard to the electronic device 302(5), the remote system 210(1) may utilize the functional identifier 244 for the electronic device 302(5) (e.g., "zone 306(3) light") to determine that the role includes the "zone 306(3)" light.

The remote system 210(1) can then identify at least one global model 234 to associate with each of the electronic devices 302(1)-(5). For instance, the remote system 210(1) can identify at least a one global model 234 to associate with the first electronic device 302(1). In the example of FIG. 3, the at least one global model 234 can be specific to televisions and/or specific to living room televisions. Additionally, the remote system 210(1) can identify at least one global model 234 to associate with the second electronic device 302(2). In the example of FIG. 3, the at least one global model 234 can be specific to lights and/or specific to living room lights. Furthermore, the remote system 210(1) can identify at least one global model 234 to associate with the third electronic device 302(3). In the example of FIG. 3, the at least one global model 234 can be specific to ovens and/or specific to kitchen ovens. Moreover, the remote system 210(1) can identify at least one global model 234 to associate with the fourth electronic device 302(4). In the example of FIG. 3, the at least one global model 234 can be specific to lights and/or specific to kitchen lights. Finally, the remote system 210(1) can identify at least one global model 234 to associate with the fifth electronic device 302(5). In the example of FIG. 3, the at least one global model 234 can be specific to lights and/or specific to porch lights. The remote system 210(1) can then store each of the identified global models 234 within the profile 240, which is represented in FIG. 2.

In some instances, in addition to, or alternatively from, using the functional identifiers 246 to associated global models 234 with the electronic devices 302(1)-(5), the remote system 210(1) can utilize local data 248 associated with the electronic devices 302(1)-(5). For instance, as described above, the remote system 210(1) can receive local data 248 indicating actual use of the electronic devices 302(1)-(5) within the environment, such as times that the electronic devices 302(1)-(5) are in the on-state and times at which the electronic device 302(1)-(5) are in the off-state. The remote system 210(1) can then use the local data 248 to associate the electronic devices 302(1)-(5) with global models 234. For example, the remote system 210(1) can match the actual usage of the electronic device 302(1)-(5) to expected behaviors of electronic devices, as indicated by the global models 234, to associate the electronic devices 302(1)-(5) with the global models 234.

Initially, in the example of FIG. 3, the remote system 210(1) may utilize each of the global models 234 associated with the respective electronic devices 302(1)-(5) to identify anomalies within the environment 202(1). In some instances, an anomaly can correspond to one of the electronic devices 302(1)-(5) functioning differently than expected based on at least one model associated with the electronic device 302(1)-(5). For example, an anomaly can include the electronic device 302(3) being powered on at a time when a global model 234 associated with the electronic device 302(3) indicates that the expected behavior for the electronic device 302(3) should be in an off-state. For a second example, an anomaly for the electronic device 302(5) can include the electronic device being powered off at a time when a global model 234 associated with the electronic device 302(5) indicates that the expected behavior for the electronic device 302(5) should be in an on-state. Finally, for a third example, an anomaly for the electronic device 302(4) can include the electronic device 302(4) operating at a first power level when a global model 234 associated with the electronic device 302(4) indicates that the electronic device 320(4) is expected to be operating at a second power level.

In some instances, to identify anomalies, the remote system 210(1) may continuously receive, from each electronic device 302(1)-(5) and/or the voice-controlled device 222(1), local data 248 that indicates the current state of the respective electronic device 302(1)-(5). For instance, and again using the electronic device 302(5) as an example, the electronic device 302(5) may send local data 248 to the remote system 210(1) that indicates the state of the electronic device 302(5), such as an on-state (e.g., powered on) or off-state (e.g., powered off). In some instances, the electronic device 302(5) sends the local data 248 to the remote system 210(1) at given time intervals, such as every second, minute, hour, or the like. In some instances, the electronic device 302(5) sends the local data 248 to the remote system 210(1) in response to receiving a message from the remote system 210(1) requesting the local data 248. The remote system 210(1) can then use the global model 234 associated with the electronic device 302(5) to identify an anomaly.

For instance, the remote system 210(1) can utilize the anomaly component 250 to analyze the local data 248 received from the electronic device 302(5) with the respect to the global model 234 associated with the electronic device 302(5) to identify an anomaly. In some instances, the anomaly component 250 identifies an anomaly when the current state of the electronic device 302(5) is different than the expected state for the electronic device 302(5). For example, the anomaly component 250 can identify an anomaly when the electronic device 302(5) is in an on-state at a time that the global model 324 indicates the electronic device 302(5) is expected to be in an off-state. For another example, the anomaly component 250 can identify an anomaly when the electronic device 302(5) is in an off-state at a time that the global model 324 indicates the electronic device 302(5) is expected to be in an on-state.

Additionally, or alternatively, in some instances, to identify anomalies, the remote system 210(1) may utilize audio data (also represented by local data 248) that the remote system 210(1) receives from the voice-controlled device 220(1). For instance, and again using the electronic device 302(5) as an example, the remote system 210(1) may receive audio data 310 representing an utterance 312 from the user 204(1). The utterance 312 may correspond to a request from the user 204(1) to power on the electronic device 302(5). In response, the remote system 210(1) can utilize the instruction component 230 to send an instruction that causes the electronic device 302(5) to switch from an off-state to an on-state. In some instances, the remote system 210(1) sends the instruction to the electronic device 302(5) using the network 212. In some instances, the remote system 210(1) sends the instruction to the voice-controlled device 220(1) using the network 212. In response to receiving the instruction, the voice-controlled device 220(1) sends the instruction and/or an additional instruction to the electronic device 302(5) that causes the electronic device 302(5) to switch from an off-state to an on-state.

After causing the electronic device 302(5) to switch to the on-state, the remote system 210(1) can utilize the anomaly component 250 to determine when an anomaly occurs with the electronic device 302(5). For instance, the anomaly component 250 may presume that the electronic device 302(5) remains in the on-state until the remote system 210(1) receives additional audio data representing an utterance 312 that requests the electronic device 302(5) be powered off. If the remote system 210(1) does not receive such audio data before a time in which the global model 234 indicates that the electronic device 302(5) is expected to be in the off-state, the anomaly component 250 may identify an anomaly with the electronic device 302(5). For example, the anomaly component 250 may determine that the electronic device 302(5) is in an on-state at a time that the global model 234 indicates the electronic device 302(5) is expected to be in an off-state.

In some instances, the remote system 210(1) can utilize one or more previous behaviors associated with the electronic devices 302(1)-(5) when identifying an anomaly. For instance, and again using the electronic device 302(5) as an example, the anomaly component 250 may determine that the electronic device 302(5) is currently in an on-state when the global model 234 indicates that the expected behavior for the electronic device 302(5) includes an off-state. Based on the determination, the anomaly component 250 can then determine if the electronic device 302(5) was powered on during a time period at which the anomaly component 250 expects the electronic device 302(5) to be powered on using the global model 234. If the anomaly component 250 determines that the electronic device 302(5) was powered on during a time at which the anomaly component 250 expected the electronic device 302(5) to be powered on, according to the global model 234, then the anomaly component 250 may determine that there is an anomaly with the electronic device 302(5). However, if the anomaly component 250 determines that the electronic device 302(5) was powered on during at a time at which the anomaly component 250 did not expect the electronic device 302(5) to be powered on, according to the global model 234, then the anomaly component 250 may determine that there is not an anomaly with the electronic device 302(5).

For example, a global model 234 may indicate that an electronic device 302(5) is expected to be powered on between 8:00 a.m. and 11:00 a.m., and expected to powered off between 11:00 a.m. and 8:00 a.m. each day. If the anomaly component 250 determines that the electronic device 302(5) is powered on at 2:00 p.m., the anomaly component 250 may identify a potential anomaly with the electronic device 302(5). In response, the anomaly component 250 can determine if the electronic device 302(5) was powered on between 8:00 a.m. and 11:00 a.m., as expected based on the global model 234. If the electronic device 302(5) was powered on between 8:00 a.m. and 11:00 a.m., then the anomaly component 250 may determine that the potential anomaly is an actual anomaly. However, if the electronic device 302(5) was powered on between 11:00 a.m. and 8:00 a.m., which is not expected based on the global model 234, then the anomaly component 250 may determine that the potential anomaly is not in fact an actual anomaly.

In some instances, the remote system 210(1) can further utilize a confidence associated with the global model 234 when identifying an anomaly. The confidence can correspond to a value that indicates how likely it is that the one or more parameters of the global model match the actual behavior of the electronic device 302(5) within the environment. In some instances, since the global model 234 is generated using data from other electronic devices (e.g., electronic device(s) 206(2)), the confidence may be low. In some instances, the remote system 210(1) utilizes the confidence as a third criteria for determining if a potential anomaly is an actual anomaly.

For example, and using the example above where the global model 234 indicates that the electronic device 302(5) is expected to be powered on between 8:00 a.m. and 11:00 a.m., and expected to powered off between 11:00 a.m. and 8:00 a.m. each day, the anomaly component 250 may identify a potential anomaly with the electronic device 302(5) if the electronic device 302(5) is in the on-state at 2:00 p.m. Based on identifying the potential anomaly, the anomaly component 250 can then determine if the electronic device 302(5) was powered on between 8:00 a.m. and 10:00 a.m., as expected based on the global model 234. Additionally, the anomaly component 250 can determine a confidence associated with the global model 234. The anomaly component 250 can then determine if the potential anomaly is an actual anomaly based on the electronic device 302(5) being in the on-state at 2:00 p.m. (e.g., first criteria), the electronic device 302(5) being powered on between 8:00 a.m. and 11:00 a.am. (e.g., second criteria), and the confidence for the global model 234 (criteria).

For example, anomaly component 250 may determine that the potential anomaly is an actual anomaly as long as the first two criteria are satisfied and the confidence associated with the global model 234 is equal to or greater than a confidence threshold. For another example, the anomaly component 250 may determine that the potential anomaly is not an actual anomaly if the first two criteria are satisfied and the confidence associated with the global model 234 is below the confidence threshold. In some instances, the confidence threshold can include a value between 0 and 100, such as 50, 60, 90, or the like. In some instances, the confidence threshold can include a value between any other range of numbers. Additionally, in some instances, the confidence threshold can be specific to the type of device and/or role associated with the electronic device. For instance, the remote system 210(1) may use a first confidence threshold for lights and a second confidence threshold for televisions.

Additionally, or alternatively, in some instances, the remote system 210(1) can utilize confidence(s) that are associated with one or more times indicated by the global model 234. For example, the global model 234 may indicate that, based on the global data 214, an electronic device 302(5) is in the off-state at 8:00 p.m. 50% of the time and in the off-state at 9:00 p.m. 75% of the time. In such an example, the remote system 210(1) may set a greater confidence (e.g., 75% confidence value) that the electronic device 302(5) is expected to be in the off-state at 9:00 p.m. than the confidence (e.g., 50% confidence value) that the electronic device 302(5) is expected to be in the off-state at 8:00 p.m.

For example, and using the example above where the global model 234 indicates that the electronic device 302(5) is expected to be powered on between 8:00 a.m. and 11:00 a.m., and expected to powered off between 11:00 a.m. and 8:00 a.m. each day, the anomaly component 250 may identify a potential anomaly with the electronic device 302(5) if the electronic device 302(5) is in the on-state at 2:00 p.m. Based on identifying the potential anomaly, the anomaly component 250 can then determine if the electronic device 302(5) was powered on between 8:00 a.m. and 10:00 a.m., as expected based on the global model 234. Additionally, the anomaly component 250 can determine a confidence associated with the electronic device 302(5) being in the on-state at 2:00 p.m. The anomaly component 250 can then determine if the potential anomaly is an actual anomaly based on the electronic device 302(5) being in the on-state at 2:00 p.m. (e.g., first criteria), the electronic device 302(5) being powered on between 8:00 a.m. and 11:00 a.am. (e.g., second criteria), and the confidence for the electronic device 302(5) being in the on-state at 2:00 p.m. (criteria).

For example, the anomaly component 250 may determine that the potential anomaly is an actual anomaly as long as the first two criteria are satisfied and the confidence associated with the time (e.g., 2:00 p.m.) is equal to or greater than a confidence threshold. For another example, the anomaly component 250 may determine that the potential anomaly is not an actual anomaly if the first two criteria are satisfied and the confidence associated with the time (e.g., 2:00 p.m.) is below the confidence threshold. In some instances, the confidence threshold associated with the time can include a value between 0 and 100, such as 50, 60, 90, or the like. In some instances, the confidence threshold associated with the time can include a value between any other range of numbers. Additionally, in some instances, the confidence threshold associated with the time can be specific to the type of device and/or role associated with the electronic device 302(5). For instance, the remote system 210(1) may use a first confidence threshold for lights and a second confidence threshold for televisions.

In some instances, the remote system 210(1) can take one or more actions based on identifying an anomaly with one of the electronic devices 302(1)-(5). For instance, an action can include querying the user 204(1) within the environment 202 to determine whether to change the state of the identified electronic device 302(1)-(5). For example, and again using the electronic device 302(5) as an example, the remote system 210(1) can utilize the query component 252 to generate a query regarding whether to power off the electronic device 302(5). The remote system 210(1) can then send first audio data (which can be represented by data 314) representing the query to a local device, such as the voice-controlled device 220(1). The voice-controlled device 220(1) can receive the first audio data 314 from the remote system 210(1) and, in response, output audio 316 corresponding to the query (e.g., "Would you like to power off the porch light?"). Additionally, the voice-controlled device 220(1) can generate second audio data representing an utterance 312 from the user 204(1), where the utterance 312 corresponds to the user 204(1) requesting that the remote system 210(1) power off the electronic device 302(5) (e.g., "I would like to power off the porch light). The voice-controlled device 220(1) can send the second audio data to the remote system 210(1), which can then use the instruction component 230 to determine an intent of the utterance 312 and send data to the remote system 210(1) indicating the intent. The remote system 210(1) can then generate and send, to at least one of the electronic device 302(5) or the voice-controlled device 220(1), an instruction that causes the electronic device 302(5) to power off.

In some instances, the remote system 210(1) first stores the query until the user 204(1) interacts with the remote system 210(1). For instance, the remote system 210(1) may store data representing the query along with data that indicates that the query if to be output the next time the user 204(1) interacts with the remote system 210(1) (e.g., via the voice-controlled device 220(1)), data that indicates the user 204(1), conditional data that indicates an expiration associated with the query, and/or the like. The conditional data may be used to determine if and when to output the query to based on information such as an identity of the user interacting with the device, whether the device is still in an anomalous state when the user interacts with the device, and the like.

For instance, envision that a global model 234 indicates that a particular electronic device 302(5) is expected to be powered on between 8:00 a.m. and 11:00 a.m. and powered off thereafter, and that the device remains powered on at 2:00 pm. In response, the anomaly component 250 may identify an anomaly based on the electronic device 302(5) being in an on-state at this time. Therefore, the anomaly component 250 may send a push notification to an orchestration component of the remote system 210(1) indicating that a query regarding whether to power off the device is to be transmitted to a voice-controlled device within the environment of the device 302(5) when the user next interacts with the voice-controlled device. In addition, the anomaly component 250 may provide conditional data indicating one or more conditions that are to be met in order for the voice-controlled device to output the query. In some instances, this conditional data may indicate that the query is to be output if the user next interacts with the voice-controlled device at a time that is outside of the 8:00 am and 11:00 am time range. That is, this conditional data indicates that the query is only to be outputted to the user in instances where the user interacts with the voice-controlled device at a time where the state of the device 302(5) is in fact anomalous. Additionally, or alternatively, the conditional data may store an indication of a user (or users) to which to output the query to, such that the query is only output if the user interacting with the voice-controlled device corresponds to the indicated user. In some instances, recognition of the user interacting with the device may be done using voice recognition, credentials, and/or the like.

After the push notification and corresponding conditional data is stored at the orchestration component, the remote system 210(1) may sometime thereafter receive audio data from the voice-controlled device 220(1) that represents an utterance from the user 204(1). In response, the remote system 210(2) can utilize the speech-recognition component 226 to determine that the user 204(1) is interacting with the voice-controlled device 220(1). In some instances, the remote system 210(1) and/or the remote system 210(2) can utilize other data to determine that the user 204(1) is interacting with the voice-controlled device 220(1), such as location data received from the user device 308. Based on determining that the user 204(1) is interacting with the voice-controlled device 220(1), the remote system 210(1) and/or the remote system 210(2) can identify the push notification for the user 204(1). The remote system 210(1) and/or the remote system 210(2) can then determine, based on the conditional data, whether the push notification is still valid (e.g., whether the anomaly still exists with the electronic device 302, whether the user is the user to which the query is to be outputted, etc.). If the remote system 210(1) and/or the remote system 210(2) determines that the push notification is still valid and should be output to the current user, the remote system 210(1) and/or the remote system 210(2) can send audio data representing the query to the voice-controlled device 220(1). For example, the TTS engine may receive the data representing the query, generate audio data representing the query, and send the audio data to the voice-controlled device 220(1).

In some instances, the remote system 210(1) may determine to change the state of one of the electronic device 302(1)-(5) without sending the query to the user 204(1)

and/or without receiving a response from the user 204(1) within a threshold amount of time. For instance, if the identified electronic device includes a specific type of electronic device, such as an oven 302(3) that is powered on, the remote system 210(1) may determine to power off the oven 302(3) if the remote system 210(1) does not receive a response from the user 204(1) within a threshold amount of time, such as a minute, five minutes, and/or the like. Based on the determination, the remote system 210(1) can generate and send, to at least one of the electronic device 302(3) or the voice-controlled device 220(1), an instruction that causes the electronic device 302(3) to power off.

In some instance, the remote system 210(1) can generate local models 238 associated with one or more of the electronic devices 302(1)-(5) in the environment 202(1). For instance, and as discussed above, the remote system 210(1) can receive and store the local data 248 representing behaviors of the electronic devices 302(1)-(5) over time. As discussed above, the local data 248 can indicate various states of the electronic devices 302(1)-(5), such as times the electronic devices 302(1)-(5) are powered on (e.g., in an on-state, active, etc.), times that the electronic devices 302(1)-(5) are powered off (e.g., an off-state, deactivated, etc.), times that the electronic devices 302(1)-(5) transitioned from the on-state to the off-state, times that the electronic devices 302(1)-(5) transitioned from the off-state to the on-state, various power levels of the electronic devices 302(1)-(5) at different times, and/or the like. In some instances, the remote system 210(1) can receive the local data 248 from the electronic devices 302(1)-(5).

Additionally, or alternatively, in some instances, the local data 248 can include audio data representing utterances of the user 204(1) (and/or other users) within the environment 202(1). The utterances can correspond to requests to power on electronic devices 302(1)-(5), requests to power off the electronic device 302(1)-(5), requests to change power levels of the electronic devices 302(1)-(5), and/or the like. The remote system 210(1) can then use the utterances to determine the times at which the electronic devices 302(1)-(5) are powered on (e.g., in an on-state, active, etc.), times at which the electronic devices 302(1)-(5) are powered off (e.g., an off-state, deactivated, etc.), times at which the electronic devices 302(1)-(5) transitioned from the on-state to the off-state, times at which the electronic devices 302(1)-(5) transitioned from the off-state to the on-state, various power levels of the electronic devices 302(1)-(5) at different times, and/or the like. For example, if the remote system 210(1) receives first audio data representing a first request to power on the electronic device 302(1) at 10:00 a.m., and second audio data representing a second request to power off the electronic device 302(2) at 11:00 a.m., then the remote system 210(1) can determine that the electronic device 302(1) was in the on-state between 10:00 a.m. and 11:00 a.m.

Additionally, or alternatively, the local data 248 can include responses provided by the user 204(1) (and/or one or more other users) to one or more queries from the remote system 210(1). For instance, when the remote system 210(1) sends the voice-controlled device 220(1) first audio data representing a query regarding whether to change the state of one of the electronic devices 302(1)-(5), the remote system 210(1) may receive second audio data 310 representing an utterance 312 from the user 204. The utterance 312 can correspond to a request from the user 204(1) to either change the power state of the electronic device 302(1)-(5) or not change the power state of the electronic device 302(1)-(5). The remote system 210(1) can then store audio data 310 representing the utterances, each time the remote system 210(1) receives the audio data, as the local data 248.

The remote system 210(1) can then use the global models 234 for the electronic devise 302(1)-(5) and the local data 248 to generate the local models 238. For instance, and again using the electronic device 302(5) as an example, the remote system 210(1) can utilize the machine-learning component 236 to identify a portion of the local data 248 that corresponds to the electronic device 302(5). In some instances, the portion of the local data 248 can include data that the remote system 210(1) receives from the electronic device 302(5). Additionally, or alternatively, in some instances, the portion of the local data 238 can include audio data that the remote system 210(1) receives from the voice-controlled device 220(1), where the audio data represents one or more requests associated with the electronic device 302(5). For example, the requests can include requests to power on the electronic device 302(5), requests to power off the electronic device 302(5), requests to change a power level associated with the electronic device 302(5), and/or the like.

The machine-learning component 236 can then analyze the portion of the local data 248 using one or more machine-learning algorithms to determine times at which the electronic device 302(5) was in the on-state, times at which the electronic device 302(5) was in the off-state, times at which the electronic device 302(5) was transitioned from the off-state to the on-state, times at which the electronic device 302(5) was transitioned from the on-state to the off-state, various power levels associated with the electronic device 302(5) at different times, and/or the like. The machine-learning component 236 can then use the one or more machine-learning algorithms to generate the local model 238 associated with the electronic device 302(5) by updating the one or more parameters of the global model 234 based on the determinations. In some instance, the machine-learning component 236 can continue to use the one or more machine-learning algorithms to update the local model 238 as the remote system 210(1) continues to receive new local data 248 associated with the electronic device 302(5).

For instance, the local model 238 associated with the electronic device 302(5) may include one or more parameters that indicate one or more times at which the electronic device 302(5) is expected to be in an on-state (e.g., powered on), one or more times at which the electronic device 302(5) is expected to be in an off-state (e.g., powered off), one or more times at which the electronic device 302(5) is expected to transition from the off-state to the on-state, one or more times at which the electronic device 302(5) is expected to transition from the off-state to the on-state, various power levels expected for the electronic device 302(5) at one or more times, and/or the like.

The remote system 210(1) can then use the local models 238 associated with the electronic devices 302(1)-(5) to identify anomalies within the environment 202(1), using a similar process as described above with regard to the global models 234. For instance, and again using the electronic device 302(5) as an example, the anomaly component 250 may determine that the electronic device 302(5) is currently in an on-state when the local model 238 indicates that the expected behavior for the electronic device 302(5) includes an off-state. In response, the query component 252 can generate a query regarding whether to power off the electronic device 302(5), and the remote system 210(1) can send first audio data 314 representing the query to the voice-controlled device 220(1). The voice-controlled device 220(1) can receive the first audio data 314 from the remote system 210(1) and, in response, output audio corresponding to the query. Additionally, the voice-controlled device 220(1) can generate second audio data 310 representing an utterance 312 from the user 204(1), where the utterance 312 corresponds to the user 204(1) requesting the remote system 210(1) to power off the electronic device 302(5) (e.g., "I would like the electronic device powered off"). The voice-controlled device 220(1) can send the second audio data to the remote system 210(1), which can then use the instruction component 230 to determine an intent of the utterance 312 and send data to the remote system 210(1) indicating the intent. The remote system 210(1) can then generate and send, to at least one of the electronic device 302(5) or the voice-controlled device 220(1), an instruction that causes the electronic device 302(5) to power off.

In some instances, since the local models 238 are generated using local data 248 that represents the actual use (e.g., behavior data) of the electronic devices 302(1)-(5) within the environment 202(1), the remote system 210(1) may assign a higher confidence to the local models 238. Additionally, as the remote system 210(1) continues to receive the local data 248 associated with the electronic devices 302(1)-(5), and continues to update the local models 238 (e.g., update the parameters of the local models 238) using the newly received local data 248, the remote system 210(1) can continue to increase the confidence of the local models 238. As such, in some instances, the remote system 210(1) may be more likely to determine that a potential anomaly is an actual anomaly using the local models 238 associated with the electronic devices 302(1)-(5) than the global models 234 associated with the electronic devices 302(1)-(5).

In some instances, the remote system 210(1) can update confidence(s) associated with one or more times indicated by the local models 238 using the local data 248. For example, if the percentage of time that an electronic device 302 is in the on-state at a specific time increases over time using received local data 248, then the remote system 210(1) may increase the confidence for the specific time. For another example, if the percentage of time that an electronic device 302 is in the off-state at a specific time decreases over time using the received local data 248, then the remote system 210(1) may decrease the confidence for the specific time.

In some instances, the local models 238 may further indicate correlations between the electronic devices 302(1)-(5). For example, the machine-learning component 236 may analyze the local data 248 and identify a correlation between the electronic device 302(1) and the electronic device 302(2). The correlation may indicate that the electronic device 302(1) is powered on within a threshold time period after the electronic device 302(2), such as within a minute. Based on identifying the correlation, the machine-learning component 236 can update the local model 238 associated with the electronic device 302(1) and/or the local model 238 associated with the electronic device 302(2) to indicate the correlation. Additionally, the remote system 210(1) can utilize the correlation to identify an anomaly within the environment 202(1).

For example, the remote system 210(1) may send an instruction to the electronic device 302(1) that causes the electronic device 302(2) to transition from an off-state to an on-state. The remote system 210(1) may then utilize the anomaly component 250 to analyze the local models 238 and determine that the electronic device 302(1) is usually powered on within the threshold amount of time after the electronic device 302(2) is powered on. If the electronic device 302(1) is not powered on within the threshold amount of time, the anomaly component 250 can determine that there is an anomaly within the environment 202(1). In response, the remote system 210(1) can either send the voice-controlled device 220(1) audio data representing a query regarding whether to power on the electronic device 302(1), or automatically send an instruction that causes the electronic device 302(1) to power on.

In some instances, the local models 238 may further indicate correlations between electronic devices 302(1)-(5) and sensors 304(1)-(4). For instance, the remote system 210(1) may receive sensor data from the sensors 304(1)-(4) and/or one or more other electronic devices within the environment (e.g., the voice-controlled device 220(1)). For example, the sensor data can include image data generated by an image sensor 304(1) (e.g., camera), motion data captured by a motion sensor 304(2), data generated by a window sensor 304(3) that indicates when the window is opened or closed, data generated by a door sensor 304(4) that indicates when the door is opened or closed, and/or the like. The remote system 210(1) can then store the sensor data as local data 248 in the profile 240.

The remote system 210(1) can then use the machine-learning component 236 to analyze the local data 248 in order to identify correlations between the electronic devices 302(1)-(5) and the sensors 304(1)-(4). For example, the machine-learning component 236 may analyze the local data 248 and identify a correlation between the door sensor 304(4) and the electronic device 302(4). The correlation may indicate that the electronic device 302(4) is powered on within a threshold time period after the door sensor 304(4) detects that the door is opened and then closed. Based on identifying the correlation, the machine-learning component 236 can update the local model 238 associated with the electronic device 302(4) to indicate the correlation. Additionally, the remote system 210(1) can utilize the correlation to identify an anomaly within the environment 202(1).

For example, the remote system 210(1) may receive data from the door sensor 304(4) that indicates that the door was opened and then closed. The remote system 210(1) may then utilize the anomaly component 250 to analyze the local models 238 (e.g., at least the local model 238 associated with the electronic device 302(4)) and determine that the electronic device 302(4) is usually powered on within the threshold amount of time after the door is opened and then closed. If the electronic device 302(4) is not powered on within the threshold amount of time, the anomaly component 250 can determine that there is an anomaly within the environment 202(1). In response, the remote system 210(1) can either send the voice-controlled device 220(1) audio data representing a query regarding whether to power on the electronic device 302(4), or automatically send an instruction that causes the electronic device 302(4) to power on.

Figure 4:
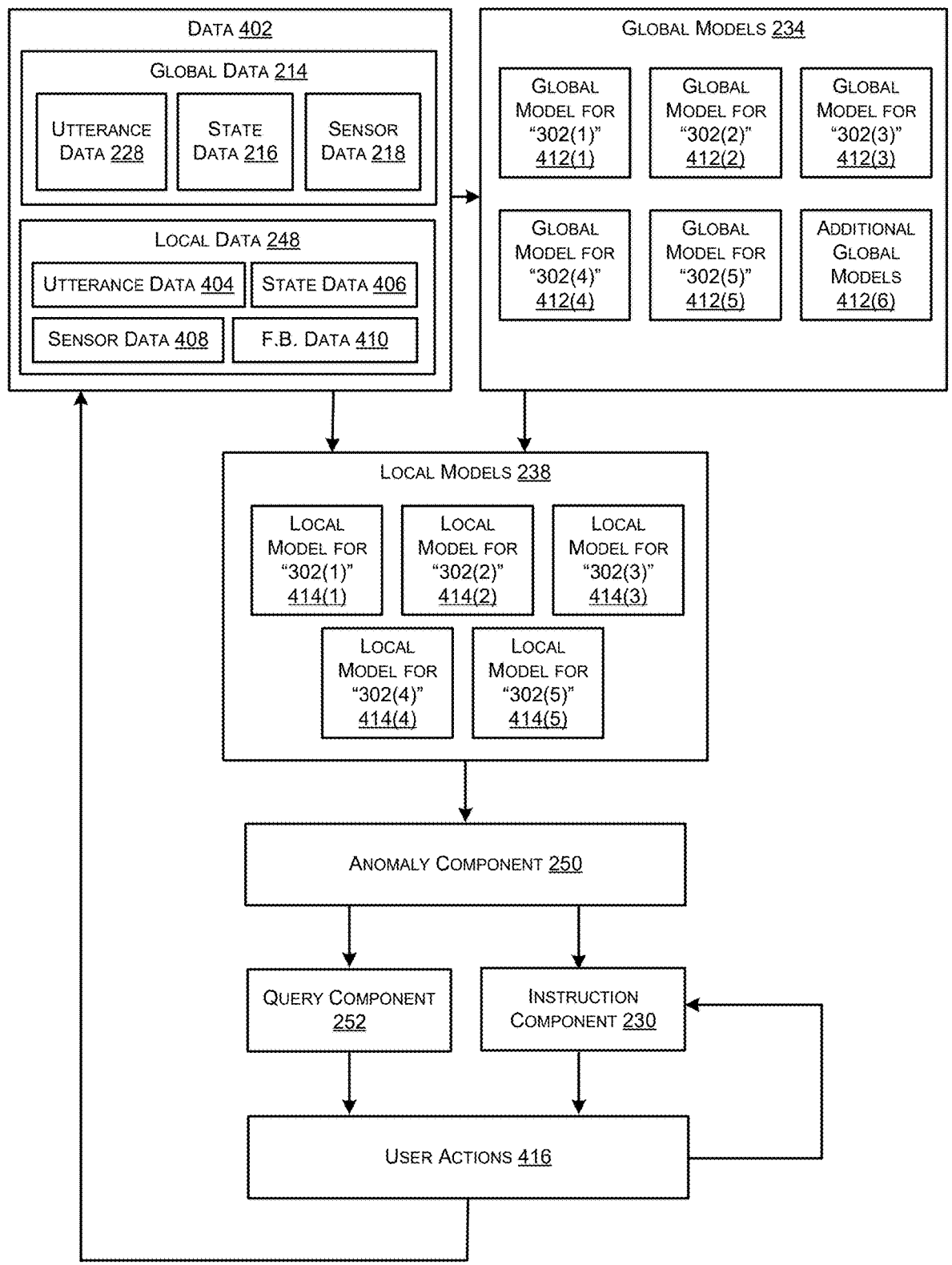
FIG. 4 is a block diagram illustrating an example of training and utilizing models associated with electronic devices in an environment.

FIG. 4 is a block diagram illustrating an example of training and utilizing models associated with the electronic devices 302(1)-(5) in the environment 202(1). As shown, the example of FIG. 4 includes data 402 that the remote system 210(1) receives from both electronic devices and voice-controlled devices that are located within various environments. For instance, the data 402 includes the local data 248 that the remote system 210(1) receives from the environment 202(1). The local data 248 includes utterance data 404 (e.g., audio data) received from the voice-controlled device 220(1), where the utterance data 404 represents at least utterances 312 from the user 204(1). Additionally, the local data 248 can include state data 406 received from electronic devices, such as the electronic devices 302(1)-(5). Furthermore, the local data 248 can include sensor data 408 received from sensors, such as sensors 304(1)-(4). Moreover, the local data 248 can include feedback data 410, which is described in detail below. Additionally, the data 402 includes the global data 214 that the remote system 210(1) receives from each of the environment 202(1) and the environment 202(2). As discussed above, the global data 214 can include the utterance data 228, the state data 216, and the sensor data 218.

The example of FIG. 4 further includes global models 234 that the remote system 210(1) generates using the global data 214. For instance, as discussed above, the remote system 210(1) can utilize one or more machine-learning algorithms to generate global models 234 using the global data 214. The remote system 210(1) can generate the global models 234 for different types of electronic devices and/or different roles that are performed by the electronic devices. For instance, in the example of FIG. 4, the global models 234 include five global models 412(1)-(5) that are respectively associated with the electronic devices 302(1)-(5) within the environment 202(1). Additionally, the global models 234 include additional global models 412(6) for additional types of electronic devices and/or different roles for electronic devices.

The example of FIG. 4 further includes local models 238 that the remote system 210(1) generates using the local data 248 and the global models 412(1)-(5). For instance, the remote system 210(1) can utilize one or more machine-learning algorithms to generate a first local model 414(1) associated with the first electronic device 302(1) using the global model 412(1) and a portion of the local data 248 that is associated with the first electronic device 302(1), a second local model 414(2) associated with the second electronic device 302(2) using the global model 412(2) and a portion of the local data 248 that is associated with the second electronic device 302(2), a third local model 414(3) associated with the third electronic device 302(3) using the global model 412(3) and a portion of the local data 248 that is associated with the third electronic device 302(3), a fourth local model 414(4) associated with the fourth electronic device 302(4) using the global model 412(4) and a portion of the local data 248 that is associated with the fourth electronic device 302(4), and a fifth local model 414(5) associated with the fifth electronic device 302(5) using the global model 412(5) and a portion of the local data 248 that is associated with the fifth electronic device 208(5).

In the example of FIG. 4, the anomaly component 250 can then utilize the local models 238 to detect anomalies associated with the electronic devices 302(1)-(5) within the environment 202(1), using the processes described above. Additionally, based on the anomaly detector 250 detecting an anomaly within the environment 202(1), the remote system 210(1) can determine to send a query regarding whether to change a state of at least one of the electronic devices 302(1)-(5) based on the anomaly and/or the remote system 210(1) can determine to send an instruction to cause a change in the state of at least one of the electronic devices 302(1)-(5). For example, the remote system 210(1) can utilize the query component 252 to generate the query, and then the remote system 210(1) can send data representing the query to the voice-controlled device 220(1). For another example, the remote system 210(1) can utilize the instruction component 230 to generate the instruction, and then the remote system 210(1) can send the instruction to at least one of the electronic device 302 associated with the anomaly and/or the voice-controlled device 220(1).

The example of FIG. 4 further includes user actions 416. The user actions 416 may represent any action that is taken by the user 204(1) based on the query from the remote system 210(1). For example, the user actions 416 may include the user 204(1) providing an utterance 312 to the voice-controlled device 220(1) that indicates that the user 204(1) wants to change the state of the electronic device 302 that is associated with the anomaly. In response, the voice-controlled device 220(1) can generate audio data representing the utterance 312 and send the audio data to the remote system 210(1). The remote system 210(1) can then analyze the audio data to determine an intent of the user 204(!) and, in response, utilize the instruction component 230 to send an instruction that causes the state of the electronic device 302 to change.

For a second example, the user actions 416 may include the user 204(1) providing an utterance 312 to the voice-controlled device 220(1) that indicates that the user 204(1) does not want to change the state of the electronic device 302 that is associated with the anomaly. In response, the voice-controlled device 220(1) can generate audio data representing the utterance 312 and send the audio data to the remote system 210(1). The remote system 210(1) can then analyze the audio data to determine an intent of the user 204(1) and, in response, refrain from sending an instruction that causes the state of the electronic device 302 to change.

For a third example, the user 204(1) may manually change the state of the electronic device 302. For instance, if the anomaly is that the electronic device 302 is in an on-state, then the user 204(1) can manually turn the electronic device 302 to an off-state. In response, the electronic device 302 can send data to the remote system 210(1), where the data indicates that the electronic device 302 has been switched from the on-state to the off-state.

Additionally, in the Example of FIG. 4, the remote system 210(1) receives the audio data representing the utterances and/or the state data indicating state changes to the electronic devices 302(1)-(5). In response, the remote system 210(1) can store the audio data and the state data as the feedback data 410 in the local data 248 and/or the audio data and the local data in the global data 214. Additionally, the remote system 210(1) can respectively use the new global data 214 and the feedback data 410 to update the global models 234 and/or the local models 238. By updating the models, the remote system 210(1) is able to generate models that are more custom to the environment 202(1).

Figure 5A:
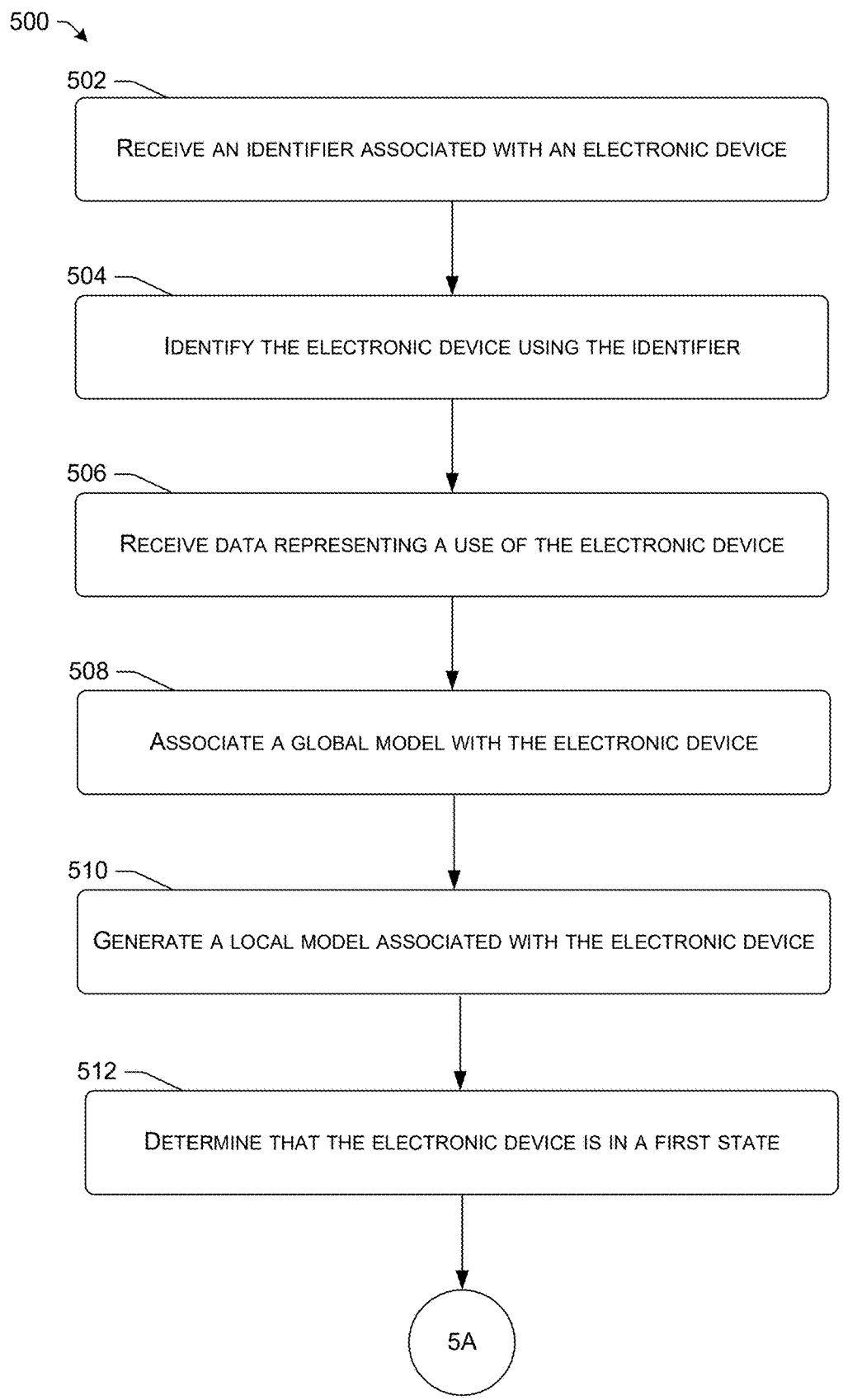
FIGS. 5A-5B illustrate an example process for generating models associated with an electronic device, and then using at least one of the models to detect an anomaly for the electronic device.
Figure 5B:
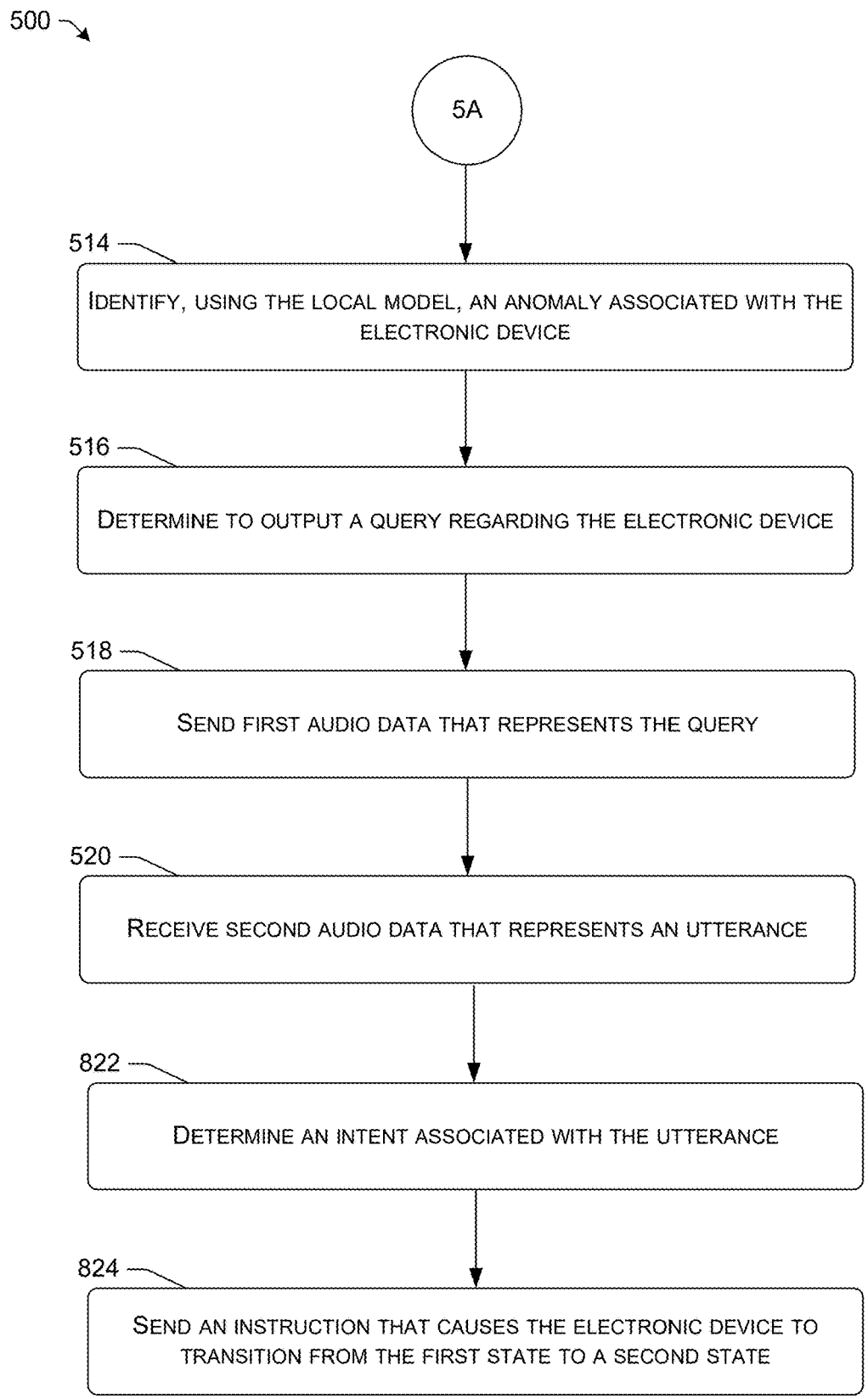

FIGS. 5A-5B illustrate an example process 500 for generating models associated with an electronic device, and then using at least one of the models to detect an anomaly for the electronic device. The process 500, as well as each process described herein, is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. Additionally, any number of the described blocks can be optional and eliminated to implement the processes.

At 502, the process 500 receives an identifier associated with an electronic device and at 504, the process 500 identifies the electronic device using the identifier. For instance, a remote system 210(1) may receive data from a user device. In some instances, the data may represent an immutable identifier and a functional identifier associated with the electronic device. The remote system 210(1) can then use the immutable identifier and/or the functional identifier to identify the electronic device. For example, the remote system 210(1) can use the immutable identifier to identify the electronic device, and then identify a type of device based on the identity of the electronic device. For another example, the remote system 210(1) can identify the type of device and/or a role associated with the electronic device using the functional identifier.

At 506, the process 500 receives data representing a use of the electronic device. For instance, the remote system 210(1) may receive, from the electronic device, state data that indicates various timestamped states associated with the electronic device. The states can include an on-state, an off-state, a time at which the electronic device was transitioned (e.g., switched) from the off-state to the on-state, a time at which the electronic device transitioned (e.g., switched) from the on-state to the off-state, and/or the like. Additionally, the remote system 210(1) may receive, from a voice-controlled device, audio data representing requests to change the state of the device. The remote system 210(1) can then store the state data and the audio data in a database.

At 508, the process 500 associates a global model with the electronic device. For instance, the remote system 210(1) may store a database of global models, where each global model is associated with a type of device and/or role. The remote system 210(1) may thus analyze the database using the type of device, the role associated with the electronic device, and/or the data representing the use of the electronic device to identify a global model that corresponds to the electronic device. In response to identifying the global model, the remote system 210(1) may store data that associates the global model with the electronic device.

At 510, the process 500 generates a local model associated with the electronic device. For instance, the remote system 210(1) may generate the local model using both the global model associated with the electronic device and the received data. In some instances, generating the local model can include updating one or more parameters associated with the global model using the received data. In some instances, generating the local model may include generating a new model using one or more parameters from the global model and the received data. In some instances, the remote system 210(1) can then continue to update the local model as the remote system 210(1) continues to receive data representing the use of the electronic device.

At 512, the process 500 determines that the electronic device is in a first state. For instance, the remote system 210(1) may receive data indicating that the electronic device is in the first state. In some instances, the data can include state data that the remote system 210(1) receives from the electronic device. In some instances, the data can include audio data that the remote system receives from the voice-controlled device. The first state can include an on-state, an off-state, a power level, and/or the like.

At 514, the process 500 identifies, using the local model, an anomaly associated with the electronic device. For instance, the remote system 210(1) may analyze the local model to determine that the expected behavior for the electronic device includes the electronic device operating in a second state. Based on the electronic device being in the first state, the remote system 210(1) can identify the anomaly. For example, the first state may include an on-state, and the expected behavior indicated by the local model may include an off-state. Since the electronic device is in an on-state, and the expected behavior includes the off-state, the remote system 210(1) can identify the anomaly.

In some instances, the remote system 210(1) may further utilize one or more past behaviors and/or a confidence associated with the local model to determine if the anomaly is in fact and actual anomaly. For example, the remote system 210(1) may determine that the anomaly is an actual anomaly when the electronic device was transitioned to the first state at an expected time according to the local model. For another example, the remote system 210(1) may determine that the anomaly is an actual anomaly based on the local model including a confidence that is equal to or greater than a confidence threshold.

At 516, the process 500 determines to output a query regarding the electronic device and at 518, the process 500 sends first audio data representing the query. For instance, based on detecting the anomaly, the remote system 210(1) may determine to output a query regarding whether to change the state of the electronic device from the first state to the second state (e.g., power off the electronic device). The remote system 210(1) may then generate the query, and send the first audio data that represents the query to the voice-controlled device. In response, the voice-controlled device can receive first audio data and output audio that represents the query to the user.

At 520, the process 500 receives second audio data that represents an utterance and at 522, the process 500 determines an intent associated with the utterance. For instance, the remote system 210(1) may receive the second audio data from the voice-controlled device, where the second audio data represents the utterance from the user. The remote system 210(1) may then analyze the second audio data using speech recognition to determine the intent of the utterance. For instance, the remote system 210(1) may determine that the utterance requests the remote system 210(1) to change the state of the electronic device from the first state to the second state.

At 524, the process 500 sends an instruction that causes the electronic device to transition from the first state to a second state. For instance, the remote system 210(1) may generate an instruction that causes the electronic device to transition (e.g., switch) from the first state to the second state. In some instances, the remote system 210(1) may then send the instruction to the electronic device and, in response to receiving the instruction, the electronic device may transition from the first state to the second state. In some instance, the remote system 210(1) may send the instruction to another electronic device, such as the voice-controlled device or the user device. In response, the other electronic device may send the instruction and/or another instruction to the electronic device that causes the electronic device to transition from the first state to the second state.

FIG. 6 illustrates an example process 600 for utilizing a global model associated with an electronic device to generate a local model associated with the electronic device. At 602, the process 600 receives first data identifying an electronic device. For instance, a remote system 210(1) may receive the first data from a user device. In some instances, the first data may represent an immutable identifier and a functional identifier associated with the electronic device. The remote system can then use the immutable identifier and/or the functional identifier to identify the electronic device. For example, the remote system 210(1) can use the immutable identifier to identify the electronic device, and then identify a type of device based on the identity of the electronic device. For another example, the remote system 210(1) can identify the type of device and/or a role associated with the electronic device using the functional identifier.

At 604, the process 600 receives second data representing a use of the electronic device. For instance, the remote system 210(1) may receive, from the electronic device, state data that indicates various timestamped states associated with the electronic device. The states can include an on-state, an off-state, a time at which the electronic device was transitioned (e.g., switched) from the off-state to the on-state, a time at which the electronic device transitioned (e.g., switched) from the on-state to the off-state, and/or the like. Additionally, the remote system 210(1) may receive, from a voice-controlled device, audio data representing requests to change the state of the device. The remote system 210(1) can then store the state data and/or the audio data as the second data in a database.

At 606, the process 600 associates a first model with the electronic device. For instance, the remote system 210(1) may store a database of global models, where each global model is associated with a type of device and/or a role. The remote system 210(1) may thus analyze the database using the type of device, role associated with the electronic device, and/or the first data to identify at least one global model that corresponds to the electronic device. In response to identifying the at least one global model, the remote system 210(1) may store data that associates the at least one global model with the electronic device.

At 608, the process 600 generates a second model based at least in part on the first model and the second data. For instance, the remote system 210(1) may generate a local model using both the at least one global model associated with the electronic device and the received data. In some instances, generating the local model can include updating one or more parameters associated with a global model using the received data. In some instances, generating the local model may include generating a new model using one or more parameters from the global model and the received data. In some instances, the remote system 210(1) can then continue to update the local model as the remote system 210(1) continues to receive data representing the use of the electronic device.

FIG. 7 illustrates an example process 700 for using a model to detect an anomaly associated with an electronic device. At 702, the process 700 associates a model with an electronic device. For instance, a remote system 210(1) may store an association between the model and the electronic device. In some instances, the model can include a global model that the remote system 210(1) identifies based on an identifier associated with the electronic device. In some instances, the model can include a local model that the remote system 210(1) generates for the electronic device.

At 704, the process 700 determines that the electronic device is in a current state and at 706, the process 700 identifies an anomaly associated with the electronic device using the model. For instance, the remote system 210(1) may receive data indicating that the electronic device is in the current state, where the current state may include a first state. The remote system 210(1) may then analyze the model to determine that the expected behavior for the electronic device includes the electronic device operating in a second state. Based on the electronic device operating in the first state, the remote system 210(1) can identify the anomaly. For example, the first state may include an on-state, and the expected behavior indicated by the model may include an off-state. Since the electronic device is in an on-state, and the expected behavior includes the off-state, the remote system 210(1) can identify the anomaly.

At 708, the process 700 determines to output a query regarding the electronic device and at 710, the process 700 sends data representing the query. For instance, based on detecting the anomaly, the remote system 210(1) may determine to output a query regarding whether to change the state of the electronic device from the current state to the expected state (e.g., power off the electronic device). The remote system 210(1) may then generate the query, and send the data that represents the query to a voice-controlled device. In response, the voice-controlled device can receive data and output audio that represents the query to the user.

Figure 8:
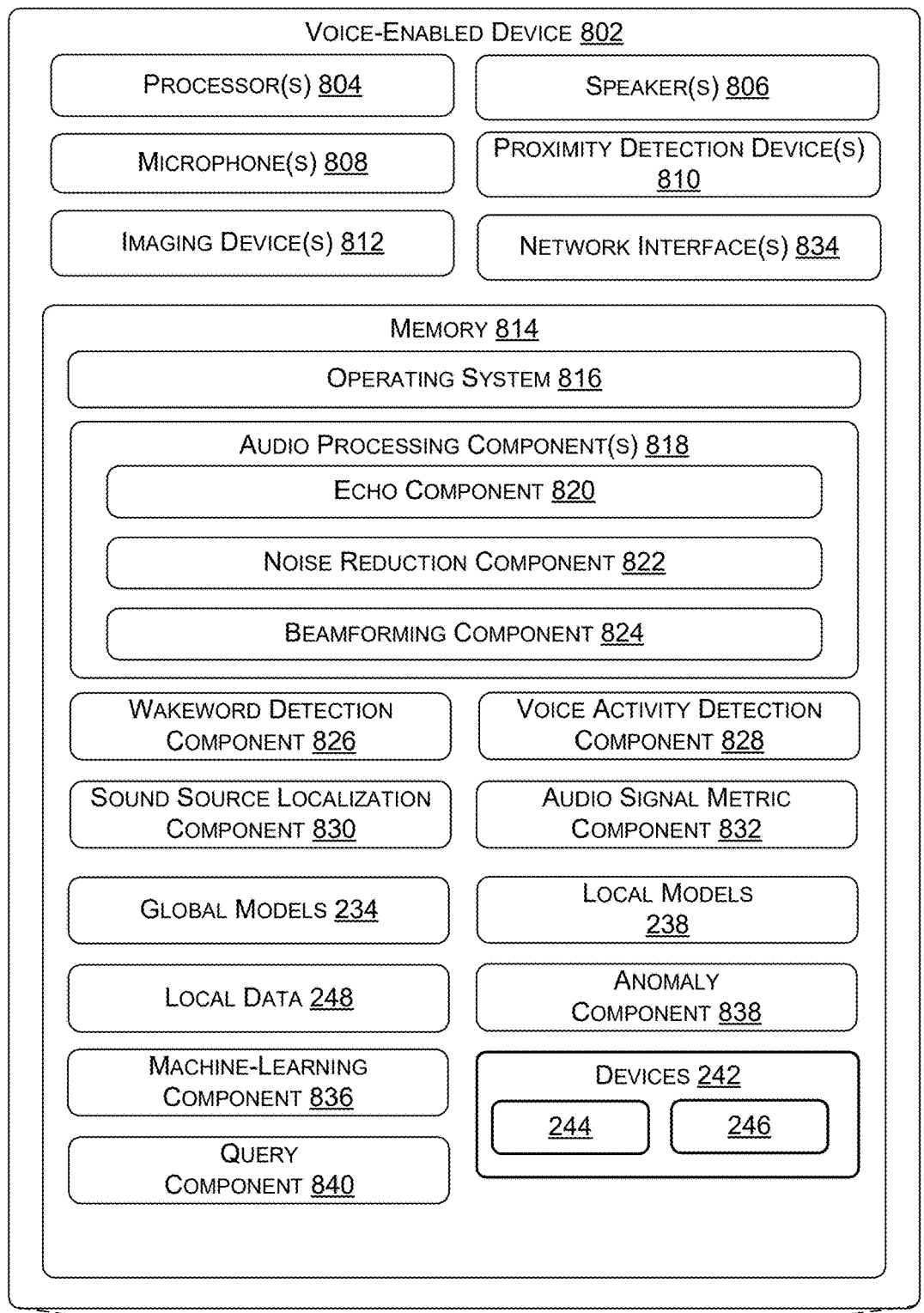
FIG. 8 illustrates a block diagram of an example architecture of a voice-controlled device that generates audio signals and metadata, and sends the audio signals and metadata to a speech processing system.

FIG. 8 illustrates block diagram of an example architecture of a voice-controlled device 802 (e.g., voice controlled device 220(1) and/or voice-controlled device 220(2) that generates an audio signal and metadata, and sends the audio signal and metadata to a speech processing system. In some examples, the metadata may include various audio signal metric values.

The voice-controlled device includes one or more processors 804, one or more speakers 806, and one or more microphones 808. The processors 804 may include a central processing unit (CPU), a graphics processing unit (GPU), a microprocessor, a digital signal processor, and so on. Although not illustrated, the voice-controlled device 802 may also include one or more input/output devices (e.g., mouse, keyboard, etc.), one or more displays (e.g., touch screen, Liquid-crystal Display (LCD), Light-emitting Diode (LED) display, organic LED display, plasma display, electronic paper display, etc.), one or more sensors (e.g., accelerometer, magnetometer, etc.), one or more lights, and so on. Any number of components of the voice-controlled device 802 may be used to receive input from a user and/or to output a response.

Although the voice-controlled device 802 is illustrated as having one or more integral speakers 806, in other embodiments the voice-controlled device 802 may not include speakers 806. For example, the voice-controlled device 802 may comprise a microphone device into which a user speaks to issue commands or may comprise a device for connection to another appliance such as a television. Instead of integrated speakers 806, embodiments such as this may use loudspeaker capabilities of other devices, including other voice-controlled devices that do have loudspeakers and different types of dedicated loudspeaker components. As one example, the voice-controlled device 802 may produce an audio output signal that drives an external loudspeaker. As another example, the voice-controlled device 802 may drive or control an external loudspeaker through a wireless data connection such as a Bluetooth connection. In other situations, the voice-controlled device 802 may be used in conjunction with a loudspeaker device that receives audio signals and other instructions from the remote system 210 (1), rather than from the voice-controlled device 802.

The microphones 808 may include sensors (e.g., transducers) configured to receive sound. The microphones 808 may generate input signals for audio input (e.g., sound). For example, the microphones 808 may determine digital input signals for an utterance of a user. In some instances, the microphones 808 are implemented in an array. The array may be arranged in a geometric pattern, such as a linear geometric form, circular geometric form, or any other configuration. For example, for a given point, an array of four sensors may be placed in a circular pattern at 90 degree increments (e.g., 0, 90, 180, 270) to receive sound from four directions. The microphones 808 may be in a planar configuration, or positioned apart in a non-planar three-dimensional region. In some implementations, the microphones 808 may include a spatially disparate array of sensors in data communication. For example, a networked array of sensors may be included. The microphones 808 may include omni-directional microphones, directional microphones (e.g., shotgun microphones), and so on.

In some examples, the microphones 808 and the speakers 806 facilitate interactions, such as dialogue, with user. The microphones 808 produce audio signals representing sound from the environment of the voice-controlled device 802, such speech utterances 234 by the user 204. The audio signals produced by the microphones 808 may comprise directional audio signals or may be used to produce directional audio signals, where each of the directional audio signals emphasizes audio from a different radial direction relative to the microphones 808.

The processors 804 of the voice-controlled device 802 may be coupled to the components of the voice-controlled device 802 to cause the voice-controlled device 802 to perform various actions or operations. In some examples, the voice-controlled device 802 may include one or more proximity detection devices 810, such as a camera, a ranging device, or other sensor that is used to determine the portion of the user 906 relative to the voice-controlled device 802, and generate corresponding proximity or distance data. This proximity or distance data may be used as metadata for purposes of arbitration.

The voice-controlled device 802 may also include imaging devices 812 which take images of the environment of the user. For instance, upon detecting a wakeword or other wake event, the voice-controlled device 802 may collect image data using the imaging devices 812. The imaging devices may include a camera, thermal imaging device, or any other type of imaging device 812 to capture images of the environment. The imaging devices 812 may generate image data, which in turn may be used as metadata for purposes of arbitration.

The voice-controlled device 802 may include memory 814. The memory 814 may be used to store any number of software components that are executable by the processors 804. Software components stored in the memory 814 may include an operating system 816 that is configured to manage hardware and services within and coupled to the voice-controlled device 802. In addition, executable components stored by the memory 814 may include audio processing components 818 configured to produce an audio signal using the microphones 808. The audio processing components 818 may include functionality for processing microphone audio signals generated by the microphones 808 and/or output audio signals provided to the speakers 806. As an example, the audio processing components 818 may include an acoustic echo cancellation or suppression component 820 for reducing acoustic echo generated by acoustic coupling between the microphones 808 and the speaker 806. The audio processing components 818 may also include a noise reduction component 822 for reducing noise in received audio signals, such as elements of microphone audio signals other than user speech.

The audio processing components 818 may include one or more audio beamformers or beamforming components 824 configured to generate directional audio signals that are focused in different directions. More specifically, the beamforming components 824 may be responsive to audio signals from spatially separated microphone elements of the microphones 808 to produce directional audio signals that emphasize sounds originating from different areas of the environment of the voice-controlled device 802 or from different directions relative to the voice-controlled device 802. The beamforming components 824 may in some cases produce audio signal metric values that may be used in arbitration. For example, the beamforming components 824 may indicate a signal strength of voice activity level corresponding to each directional audio signal.

Executable components stored in the memory 814 and executed by the processors 804 may include a wakeword detection component 826 that monitors one or more of the directional audio signals to detect user utterances of the system of the trigger expression. As described above, wakeword detection may be implemented using keyword spotting technology, as an example.

The software components may also include a voice activity detection component 828 configured to monitor levels of voice presence in the directional audio signals produced by the beamforming component 824. Levels of voice presence may be used as am audio signal metric value for purposes of arbitration. In some examples, the voice activity may include an indication of the signal strength of the speech utterance 234 and an indication of ambient noise in the environment 202. For instance, the voice activity may be a ratio of the signal strength of the speech utterance 234 in an audio data with the ambient noise in the audio data.

Software components of the voice-controlled device 802 may also include a sound source localization (SSL) component 830 that may be used to determine the distance of the user 906 from the voice-controlled device 802. The SSL component 830 is configured to analyze differences in arrival times of received sound at the respective microphones of the microphones 808 in order to determine the position from which the received sound originated. For example, the SSL component 830 may use time-difference-of-arrival (TDOA) techniques to determine the position or direction of a sound source. The determined position may be used as an audio signal metric value for purpose of performing arbitration as described herein.

The voice-controlled device 802 also has various hardware components, not shown, such as communication components, power components, I/O components, signal processing components indicators, control buttons, amplifiers, etc. For instance, rather than receiving a "wake-word" to wake up, a voice-controlled device 802 instead begin listening in response to a user 906 pressing a button on the voice-controlled device 802.

The voice-controlled device 102 may have one or more network interfaces 834 such as a wireless or Wi-Fi network communications interface, an Ethernet communications interface, a cellular network communications interface, a Bluetooth communications interface, etc., for communications with the remote system 210(1) over various types of networks, including wide-area network, local-area networks, private networks, public networks etc. In the case of a wireless communications interfaces, such interfaces may include radio transceivers and associated control circuits and logic for implementing appropriate communication protocols.

In some examples, the audio signal metric component 832 may determine an audio signal metric value for each of a plurality of audio signals (e.g., beamformed audio signals) provided by the beamformer component 824. In some embodiments, each audio signal metric value is determined based on the samples of one of a plurality of frames of a beamformed audio signal. For example, a signal-to-noise ratio may be determined for a plurality of frames for each of the plurality of beamformed audio signals.

While various processing techniques and audio signal metric values are discussed herein, any other type of audio signal metric value may be determined using the components of the voice-controlled device 802.

As also illustrated in FIG. 8, the voice-controlled device 802 can include global models 234, local models 238, local data 248, a machine-learning component 836, an anomaly component 838, a query component 840, and devices 242. For instance, in some examples, the voice-controlled device 802 can perform some and/or all of the techniques described above with regard to the remote system 210(1) in order to generate models and/or detect anomalies within an environment. For example, the voice-controlled device 802 may receive information indicating the immutable identifiers 244 and the functional identifiers 246 of the electronic devices 302(1)-(5) within the environment 202(1). The voice-controlled device 802 can further receive the local data 248 from the electronic devices 302(1)-(5) and the sensors 304(1)-(4), as well as generate data representing the utterance(s) from the user 204(1). The voice-controlled device 802 can then identify global models 234 locally, if the voice-controlled device 802 stores global models 234 (not shown in FIG. 8), or send the immutable identifiers 244, the functional identifiers 246, and/or the local data 248 to the remote system 210(1). In response, the remote system 210(1) can send the voice-controlled device 802 the global models 234 to be associated with the electronic devices 302(1)-(5).

In some instances, the voice-controlled device 802 can further utilize the machine-learning component 236 to generate and/or update the local models 238 for the electronic devices 302(1)-(5), using similar techniques as described above with regard to the machine-learning component 236. Additionally, in some instances, the voice-controlled device 802 can utilize the anomaly component 838 to identify anomalies with the electronic devices 302(1)-(5), using similar techniques as described above with regard to the anomaly component 250. Furthermore, the voice-controlled device 802 can utilize the query component 840 to generate queries to be output by the voice-controlled device 802, using similar techniques as described above with regard to the query component 252.

Figure 9A:
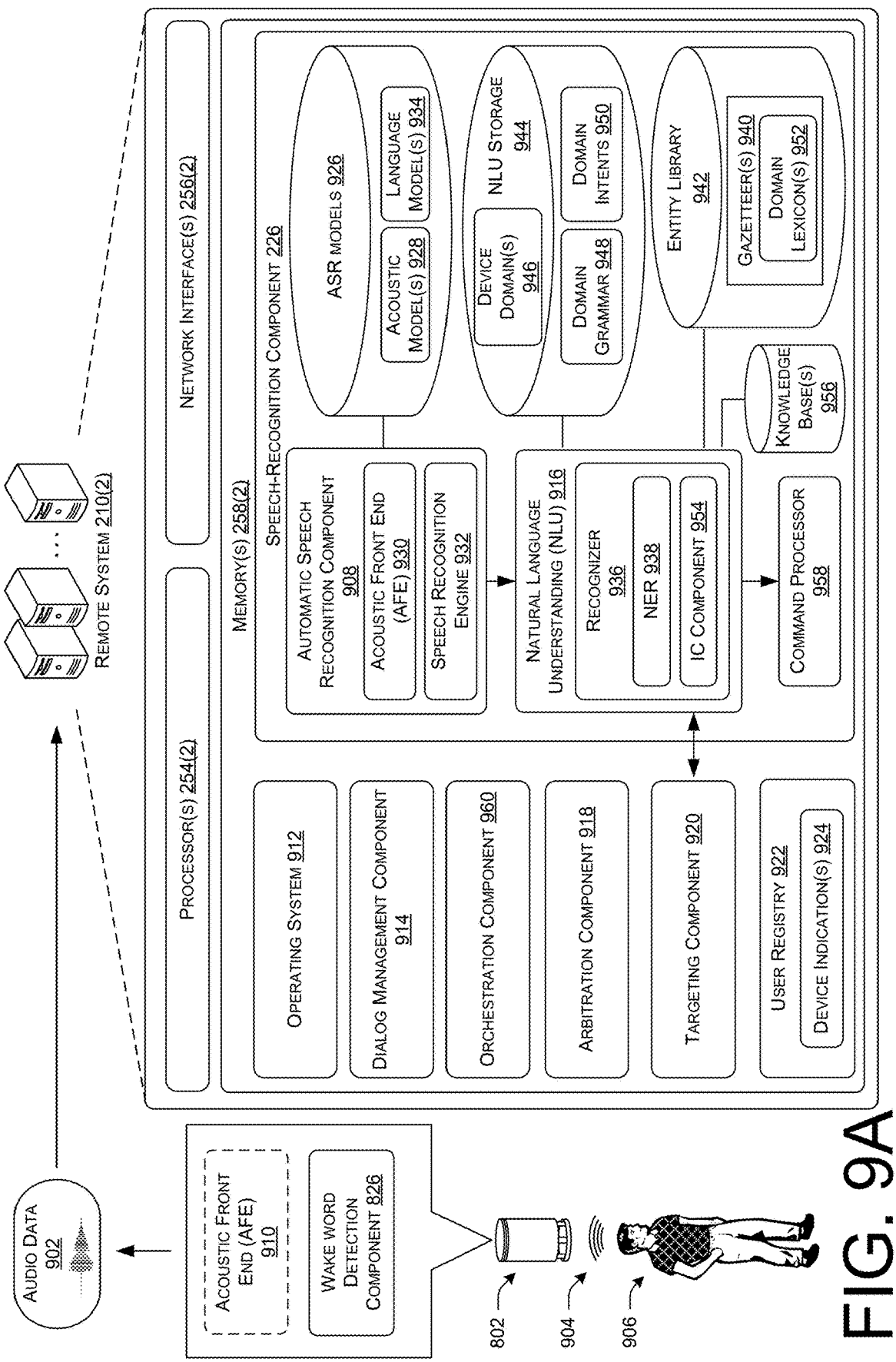
FIG. 9A illustrates a block diagram of an example architecture of a remote system which receives audio data (e.g., the audio signals) and audio data metric values from voice-controlled devices, and performs speech processing to respond to a speech utterance of a user represented in an audio data.

FIG. 9A illustrates a block diagram of an example architecture of a remote system 210(2) which receives audio data 902 (e.g., audio signal(s)) and audio data metric values from voice-controlled devices 802, and performs processing techniques to determine which of the voice-controlled devices 802 is to respond to a speech utterance 904 (e.g., utterance(s) 222(1) and/or utterance(s) 222(2) of a user 906 (e.g., user 204(1) and/or user 204(2) represented in the audio data 902.

FIG. 9A includes a conceptual diagram of how a speech utterance 904 can be processed, allowing a system to capture and execute commands spoken by a user 906, such as spoken commands that may follow a wakeword. The various components illustrated may be located on a same or different physical devices. Communication between various components illustrated in FIG. 9A may occur directly or across a network 212. An audio capture component, such as a microphone 808 of voice-controlled device 802, captures audio corresponding to a speech utterance 904. The voice-controlled device 802, using a wakeword detection component 826, then processes the speech utterance 904, or audio data corresponding to the speech utterance 904, to determine if a keyword (such as a wakeword) is detected in the speech utterance 904. Following detection of a wakeword, the voice-controlled device 802 sends audio data 902 corresponding to the speech utterance 904, to a computing device of the remote system 210(2) that includes the automatic speech recognition (ASR) component 908. The audio data 902 may be output from an acoustic front end (AFE) 910 located on the voice-controlled device 802 prior to transmission. Or, the audio data 902 may be in a different form for processing by a remote AFE 910, such as the AFE 910 located with the ASR component 908.

In various examples, the remote system 210(2) may include one or more processors 254(2) to power components, devices, and actions of the remote system 210(2), and one or more network interfaces 256(2) such as a wireless or Wi-Fi network communications interface, an Ethernet communications interface, a cellular network communications interface, a Bluetooth communications interface, etc., for communications by the remote system 210(2) over various types of networks, including wide-area network, local-area networks, private networks, public networks etc. In the case of a wireless communications interfaces, such interfaces may include radio transceivers and associated control circuits and logic for implementing appropriate communication protocols.

The remote system 210(2) may further include memory 258(2) which stores various components, components, or other executable software to perform speech processing to respond to a command in the speech utterance 904. The memory 258(2) may store an operating system 912 that is configured to manage hardware and services within and coupled to the remote system 210(2).

The memory 258(2) may further store a dialog management component 914 that is responsible for conducting speech dialogs with the user 906 in response to meanings or intents of user speech determined by the natural language understanding (NLU) component 916. The dialog management component 914 may include domain logic that is used to analyze the meaning of user speech and to determine how to respond to the user speech. The dialog management component 914 may define rules and behaviors relating to different information or topic domains, such as news, traffic, weather, to-do lists, shopping lists, music, home automation, retail services, and so forth. The domain logic maps spoken user statements to respective domains and is responsible for determining dialog responses and/or actions to perform in response to user utterances.

The memory 258(2) may further include an arbitration component 918, a targeting component 920, and a user registry 922 including the device indications 924. The arbitration component 918 may perform various functions or processes for determining a ranked list of devices based on audio data metric values for voice-controlled devices 802 that generated audio data 902 corresponding to a speech utterance 904. The targeting component 920 may perform various operations for determining which voice-controlled devices 802 are to respond to a command in the speech utterance 904. For instance, the targeting component 920 may determine, using the user registry 926, all of the voice-controlled devices 802 and/or secondary devices associated with a user and/or environment. The targeting component 920 may use the ranked list of devices, intent expressed in the speech utterance 904 determined by the NLU component 916, and the devices states stored in the device indications 926 to determine which of the devices should perform the command indicated in the speech utterance 904.

The remote system 210(2) may further include various components for processing a speech utterance 904, such as the ASR component 908 and the NLU component 916. The various components illustrated may be located on a same or different physical devices.

In some examples, audio data (e.g., audio data 902) may be received by the remote system 210(2) for speech processing for interpretation of the included speech utterance 904 (either for purposes of enabling voice-communications and/or for purposes of executing a command in the speech). The audio data may include data corresponding to the wakeword, or the portion of the audio data corresponding to the wakeword may be removed by the voice-controlled device 802 prior to sending. Upon receipt by the remote system 210(2), the ASR component 908 may convert the audio data into text. The ASR component 908 transcribes audio data into text data representing the words of the speech contained in the audio data. The text data may then be used by other components for various purposes, such as arbitration, executing system commands, inputting data, etc. A speech utterance 904 in the audio data is input to a processor configured to perform ASR which then interprets the utterance based on the similarity between the utterance and pre-established ASR language models stored in an ASR model knowledge base (ASR Models Storage 926). For example, the ASR process may compare the input audio data with models for sounds (e.g., subword units or phonemes) and sequences of sounds to identify words that match the sequence of sounds spoken in the utterance of the audio data.

The different ways a speech utterance 904 may be interpreted (i.e., the different hypotheses) may each be assigned an ASR probability or an ASR confidence score representing the likelihood that a particular set of words matches those spoken in the utterance. The ASR confidence score may be based on a number of factors including, for example, the similarity of the sound in the utterance to models for language sounds (e.g., an acoustic model 928 stored in an ASR Models Storage 926), and the likelihood that a particular word which matches the sounds would be included in the sentence at the specific location (e.g., using a language or grammar model). Thus, each potential textual interpretation of the spoken utterance (hypothesis) is associated with an ASR confidence score. Based on the considered factors and the assigned ASR confidence score, the ASR component 908 outputs the most expected text recognized in the audio data. The ASR component 908 may also output multiple ASR hypotheses in the form of a lattice or an N-best list with each hypothesis corresponding to an ASR confidence score or other score (such as probability scores, etc.).

The device or devices performing the ASR processing may include an acoustic front end (AFE) 930 and a speech recognition engine 932. The AFE 930 transforms the audio data from the microphone into data for processing by the speech recognition engine 932. The speech recognition engine 932 compares the speech recognition data with acoustic models 928, language model(s) 934, and other data models and information for recognizing the speech conveyed in the audio data. The AFE 930 may reduce noise in the audio data and divide the digitized audio data into frames representing time intervals for which the AFE 930 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE 930 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 932 may process the output from the AFE 930 with reference to information stored in speech/model storage (926). Alternatively, post front-end processed data (such as feature vectors) may be received by the device executing ASR processing from another source besides the internal AFE 930. For example, the voice-controlled device 802 may process audio data into feature vectors (for example using an on-device AFE 930) and transmit that information to a server across a network for ASR processing. Feature vectors may arrive at the remote system 210(2) encoded, in which case they may be decoded prior to processing by the processor executing the speech recognition engine 932.

The speech recognition engine 932 attempts to match received feature vectors to language phonemes and words as known in the stored acoustic models 928 and language model(s) 934. The speech recognition engine 932 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 932 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 932 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 210(2), for natural language understanding (NLU) processing, such as conversion of the text into commands for execution, either by the user device, by the remote system 210(2), or by another device (such as a server running a specific application like a search engine, etc.).

The NLU component 916 (e.g., server) may include various components, including potentially dedicated processor(s), memory, storage, etc. As shown in FIG. 9A, the NLU component 916 may include a recognizer 936 that includes a named entity recognition (NER) component 938 which is used to identify portions of query text that correspond to a named entity that may be recognizable by the system. A downstream process called named entity resolution links a text portion to a specific entity known to the system. To perform named entity resolution, the system may utilize gazetteer information 940 stored in entity library storage 942. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU component 916 takes textual input (such as the textual input determined by the ASR component 908) and attempts to make a semantic interpretation of the text. That is, the NLU component 916 determines the meaning behind the text based on the individual words and then implements that meaning. NLU component 916 interprets a text string to derive an intent or a desired action from the user as well as the pertinent pieces of information in the text that allow a device (e.g., voice-controlled device 802) to complete that action. For example, if a spoken utterance is processed using ASR component 908 and outputs the text "turn off the alarm" the NLU component 916 may determine that the user 906 intended that the voice-controlled device 802 be instructed to turn off an alarm sound being output. As another example, if the spoken utterance is processed using ASR component 908 and outputs the text "turn off an electronic device" the NLU component 916 may determine that the user 906 intended that the voice-controlled device 802 be instructed to send an instruction to the electronic device that causes the electronic device to switch from an on-state to an off-state.

The NLU component 916 may process several textual inputs related to the same utterance. For example, if the ASR component 908 outputs N text segments (as part of an N-best list), the NLU component 916 may process all N outputs to obtain NLU results.

To correctly perform NLU processing of speech input, the NLU component 916 may be configured to determine a "domain" of the utterance so as to determine and narrow down which services offered by the endpoint device (e.g., remote system 210(2) or the voice-controlled device 802) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The NER component 938 receives a query in the form of ASR results and attempts to identify relevant grammars and lexical information that may be used to construe meaning. To do so, the NLU component 916 may begin by identifying potential domains that may relate to the received query. The NLU storage 944 includes a database of device domain(s) 946 which identify domains associated with specific devices. For example, the voice-controlled device 802 may be associated with domains for music, telephony, calendaring, contact lists, and device-specific communications, but not video. In addition, the device domain(s) 946 may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 936, language model and/or grammar databases 948, a particular set of domain intents/actions 950, and a particular personalized domain lexicon 952. Each gazetteer 940 may include domain-indexed lexical information associated with a particular user and/or device. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains is ordinarily selected to be the correct result.

An intent classification (IC) component 954 parses the query to determine an intent or intents for each identified domain, where the intent corresponds to the action to be performed that is responsive to the query. Each domain is associated with a database (e.g., domain intents 950) of words linked to intents. For example, a music domain intent database 430 may link words and phrases such as "quiet," "volume off," and "mute" to a "mute" intent. A voice-message domain intent database, meanwhile, may link words and phrases such as "send a message," "send a voice message," "send the following," or the like. The IC component 954 identifies potential intents for each identified domain by comparing words in the query to the words and phrases in the domain intents 950. In some instances, the determination of an intent by the IC component 954 is performed using a set of rules or templates that are processed against the incoming text to identify a matching intent.

In order to generate a particular interpreted response, the NER component 938 applies the grammar models and lexical information associated with the respective domain to actually recognize a mention one or more entities in the text of the query. In this manner, the NER component 938 identifies "slots" (i.e., particular words in query text) that may be needed for later command processing. Depending on the complexity of the NER component 938, it may also label each slot with a type of varying levels of specificity (such as noun, place, city, artist name, song name, or the like). Each grammar model includes the names of entities (i.e., nouns) commonly found in speech about the particular domain (i.e., generic terms), whereas the lexical information 952 from the gazetteer 940 is personalized to the user(s) and/or the device. For instance, a grammar model associated with the shopping domain may include a database of words commonly used when people discuss shopping.

The intents identified by the IC component 954 are linked to domain-specific grammar frameworks (included in 950) with "slots" or "fields" to be filled. Each slot/field corresponds to a portion of the query text that the system believes corresponds to an entity. To make resolution more flexible, these frameworks would ordinarily not be structured as sentences, but rather based on associating slots with grammatical tags. For example, if "send a message" is an identified intent, a grammar framework or frameworks may correspond to sentence structures such as "Send a message to {contact}," "Send a voice message to {contact}," "Send the following to {contact}," etc.

For example, the NER component 938 may parse the query to identify words as subject, object, verb, preposition, etc., based on grammar rules and/or models, prior to recognizing named entities. The identified verb may be used by the IC component 954 to identify intent, which is then used by the NER component 938 to identify frameworks. A framework for the intent of "send a message," meanwhile, may specify a list of slots/fields applicable to play the identified "contact" and any object modifier (e.g., specifying a device of the recipient) or the like. The NER component 938 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 938 may search the database of generic words associated with the domain (in the knowledge base 956). So, for instance, if the query was "send message to Joe," after failing to determine a last name for "Joe," the NER component 938 may search the domain vocabulary for the word "Joe." In the alternative, generic words may be checked before the gazetteer information, or both may be tried, potentially producing two different results.

The output data from the NLU component 916 (which may include tagged text, commands, etc.) may then be sent to the command processor 958. The destination command processor 958 may be determined based on the NLU output. For example, if the NLU output includes a command to send a message, the destination command processor 958 may be a message sending application, such as one located on the user device or in a message sending appliance, configured to execute a message sending command. If the NLU output includes a search request, the destination command processor 958 may include a search engine processor, such as one located on a search server, configured to execute a search command.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 916 during runtime operations where NLU operations are performed on text (such as text output from an ASR component 908). Each domain may have specially configured components to perform various steps of the NLU operations.

For example, in an NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 936. Each recognizer may include various NLU components such as an NER component 938, IC component 954 and other components such as an entity resolver, or other components.

As noted above, multiple devices may be employed in a single remote system 210(2). In such a multi-device system, each of the devices may include different components for performing different aspects of the speech processing. The multiple devices may include overlapping components. The components of the voice-controlled device 802 and the remote system 210(2), as illustrated herein are exemplary, and may be located in a stand-alone device or may be included, in whole or in part, as a component of a larger device or system, may be distributed across a network or multiple devices connected by a network, etc.

Figure 9B:
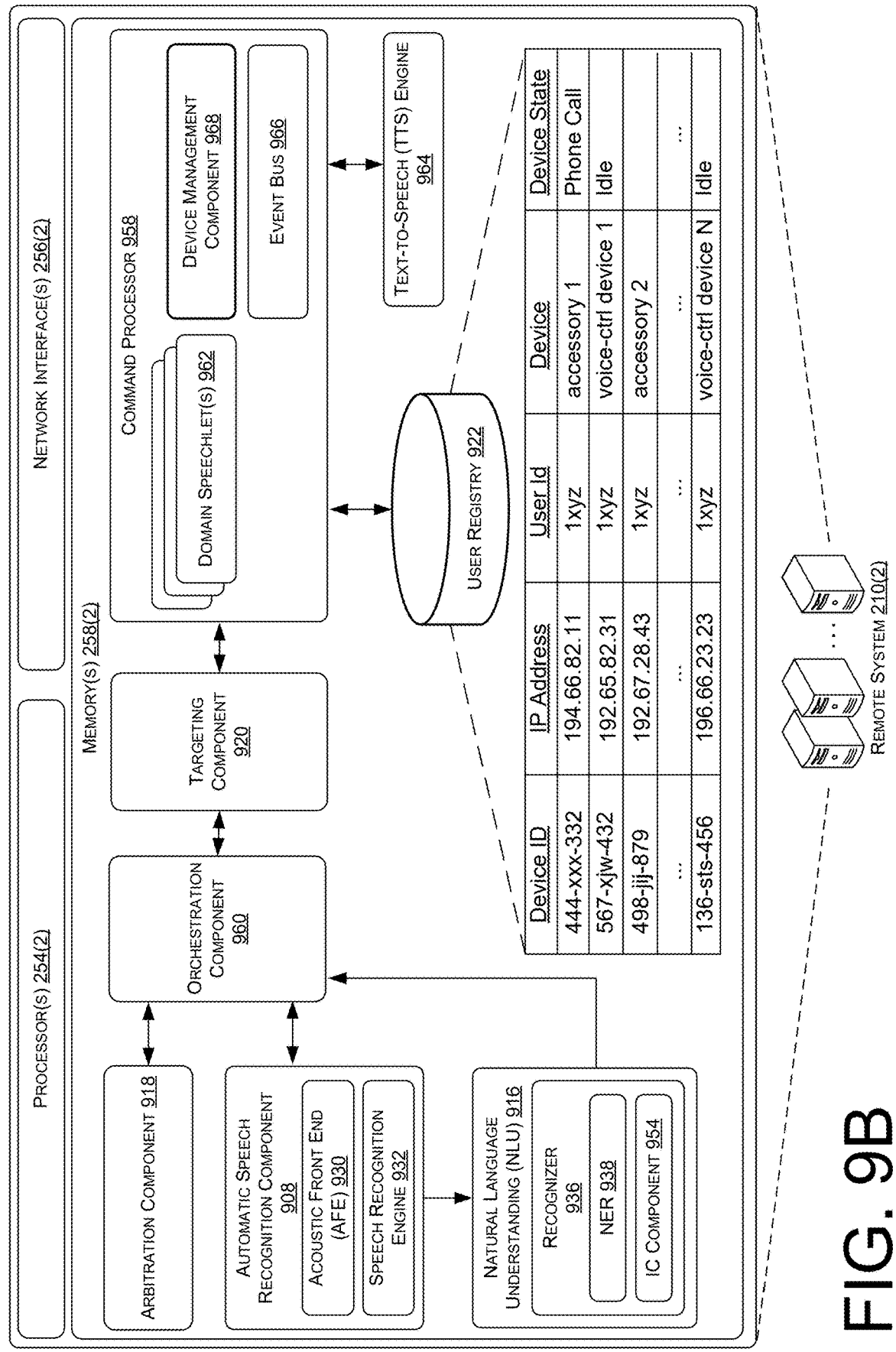
FIG. 9B illustrates a block diagram of an example architecture of a remote system including a command processor configured to make a decision as to which voice-controlled device is to respond to a speech utterance of a user.

FIG. 9B illustrates a block diagram of an example architecture of the remote system 210(2) including the command processor 958 configured to generate a command that the selected voice-controlled device 802 uses to respond to the speech utterance 904. As illustrated in FIG. 9B, the remote system 210(2) includes the orchestration component 960 and a speech-recognition component 226 comprising the ASR component 908 and the NLU component 916, may be coupled to the targeting component 920 and provide the targeting component with the intent determined to be expressed in the speech utterance 904. The orchestration component 960 may stream the audio data 902 to the ASR component 908, which detects the speech utterance 904 endpoint and sends a message to the voice-enabled device 802 to close the stream of the audio data 902. The ASR component 908 may then return the textual data to the orchestration component 960. In various examples, the textual data corresponding to the speech utterance 904 may be sent from the orchestration component 960 to the NLU component 916 to be analyzed or processed by the NLU component 916 to determine an intent expressed by the user 906 in the speech utterance 904. Once the intent has been determined by the NLU component 916, the orchestration component 960 may pass the intent to a targeting component 920 to use to determine which of the voice-enabled devices 802 is to respond to the speech utterance 904.

Further, the arbitration component 918 may provide the ranked list of devices to the targeting component 920, as well as device indicators (e.g., IP addresses, devices names, etc.) for one or more of the voice-controlled devices 802 in the ranked list of devices. The targeting component 920 may then perform techniques to determine a target device (e.g., a device to perform the requested operation), and provide various data to the command processor 958. For instance, the targeting component 920 may provide the command processor 958 with various device identifiers of the voice-controlled devices 802, the determined target device, the determined intent and/or command, etc.

The command processor 958 and/or NLU component 916 may determine a domain based on the intent and, based on this determination, route the request corresponding to the audio data to the appropriate domain speechlet, such as the illustrated domain speechlets 962. The domain speechlet 962 may comprise any type of device or group of devices (e.g., hardware device, virtual devices or partitions, server, etc.), and may receive the text data and/or an intent associated with the audio data 902 and determines how to respond to the request. For instance, the intent for a command "please turn of an electronic device" may be routed to a smart home domain speechlet 962 which controls devices connected to the voice-controlled devices 802, such as a light. The smart home domain speechlet 962 may determine a command to generate based on the intent of the user 906 to switch the light from an on-state to an off-state.

Various types of domain speechlets 962 may be used to determine which devices 802 to use to respond to a speech utterance 904, as well as the appropriate response and potential additional content (e.g., audio data, instructions, etc.). For example, the domain speechlets 962 may include a third party skills domain speechlet 962 which may handle intents associated with gaming, productivity, etc., a music domain speechlet 962 which may handle intents associated with music play requests (e.g., Amazon Music, Pandora, Spotify, iHeart, etc.), a video domain speechlet 962 which may handle intents associated with video play requests (e.g., Amazon Video, HBO, Netflix, Hulu, etc.), a household organization domain speechlet 962 which may handle intents associated with household activities (e.g., calendars, reminders, timers, etc.), a smart home domain speechlet 962 which may handle intents associated with controlling smart devices (e.g., controlling lights, door locks, home monitoring, etc.), an automotive domain speechlet 962, a shopping domain speechlet 962 which may handle shopping requests (e.g., making a shopping list, ordering items online, etc.), and/or a weather domain speechlet 962 which may handle requests for weather forecasts (e.g., providing a URL to a weather website, providing weather related images and/or videos, etc.).

After the domain speechlet 962 generates the appropriate command based on the intent of the user 906, and/or provides additional content, such as audio data, to be output by one of the voice-controlled devices 802, the domain speechlet 962 may provide this information back to the remote system 210(2), which in turns provides some or all of this information to a text-to-speech (TTS) engine 964. The TTS engine 964 then generates an actual audio file for outputting the second audio data (e.g., the command) determined by the domain speechlet. The audio file (or "audio data") may represents the command (e.g., text) generated by the domain speechlet 962 and/or the additional content). After generating the file (or "audio data"), the TTS engine 964 may provide this data back to the remote system 210(2).

The remote system 210(2) may then publish (i.e., write) some or all of this information to an event bus 966. That is, the remote system 210(2) may provide information regarding the initial request (e.g., the speech, the text, the domain/intent, etc.), the response to be provided to the voice-controlled device 802 (e.g., the command to hang up a phone call, the command to turn off an alarm, etc.), or any other information pertinent to the interaction between the voice-controlled device 802 and the remote system 210(2) to the event bus 966.

Within the remote system 210(2), one or more components or services may subscribe to the event bus 966 so as to receive information regarding interactions between electronic devices and the remote system 210(2). In the illustrated example, for instance, the device management component 968 may subscribe to the event bus 966 and, thus, may monitor information regarding these interactions. In some examples, monitoring information in the event bus 966 may comprise communications between various components of the remote system 210(2). For example, the targeting component 920 may monitor the event bus 966 to identify device state data for voice-controlled devices 802. In some examples, the event bus 966 may "push" or send indications of events and/or device state data to the targeting component. Additionally, or alternatively, the event bus 966 may be "pulled" where the targeting component sends requests to the event bus 966 to provide an indication of device state data for a voice-controlled device 802. The event bus 966 may store indications of the device states for the voice-controlled devices 802, such as in a database (e.g., user registry 922), and using the stored indications of the device states, send the device state data for voice-controlled devices 802 to the targeting component. Thus, to identify device state data for a voice-controlled device 802, the targeting component 920 may send a request to the event bus 966 (e.g., event component) to provide an indication of the device state data associated with a voice-controlled device 802, and receive, from the event bus 966, the device state data that was requested.

The device management component 968 functions to monitor information published to the event bus 966 and identify events that may trigger action. For instance, the device management component 968 may identify (e.g., via filtering) those events that: (i) come from voice-controlled devices 802 that are associated with secondary device(s) (e.g., have secondary devices in their environments such as televisions, personal computing devices, lights, appliances, electronic devices 208(1)-(5), etc.), and (ii) are associated with supplemental content (e.g., image data, video data, etc.). The device management component 968 may reference the user registry 922 to determine which voice-controlled devices 802 are associated with secondary devices, as well as determine device types, states, and other capabilities of these secondary devices. For instance, the device management component 968 may determine, from the information published to the event bus 966, an identifier associated with the voice-controlled device 802 making the corresponding request or the voice-controlled device 802 selected to respond to the speech utterance 904. The device management component 968 may use this identifier to identify, from the user registry 922, a user account associated with the voice-controlled device 802. The device management component 968 may also determine whether any secondary devices have been registered with the identified user account, as well as capabilities of any such secondary devices, such as how the secondary devices are configured to communicate (e.g., via WiFi, short-range wireless connections, etc.), the type of content the devices are able to output (e.g., audio, video, still images, flashing lights, etc.), and the like.

The device management component 968 may determine whether a particular event identified is associated with supplemental content. That is, the device management component 968 may write, to a datastore, indications of which types of events and/or which primary content or responses are associated with supplemental content. In some instances, the remote system 210(2) may provide access to third-party developers to allow the developers to register supplemental content for output on secondary devices for particular events and/or primary content. For example, if a voice-controlled device 802 is to output that the weather will include thunder and lightning, the device management component 968 may store an indication of supplemental content such as thunder sounds, pictures/animations of lightning and the like. In another example, if a voice-controlled device 802 is outputting information about a particular fact (e.g., "a blue whale is the largest mammal on earth . . . "), then a secondary device, such as television, may be configured to provide supplemental content such as a video or picture of a blue whale. In these and other examples, the device management component 968 may store an association between the primary response and/or content (e.g., outputting of information regarding the world's largest mammal) and corresponding supplemental content (e.g., the audio data, image data, or the like). In some instances, the device management component 968 can also indicate which types of secondary devices are to output which supplemental content. For instance, in the instant example, the device management component 968 may store an indication that secondary devices of a class type "tablet" are to output a picture of a blue whale. In these and other instances, meanwhile, the device management component 968 may store the supplemental content in association with secondary-device capabilities (e.g., devices with speakers output the audio commentary, devices with screens output the image, etc.).

Finally, the device management component 968 may determine how to transmit response and/or supplement content (and/or information acquiring the content) to the voice-controlled devices 802 and/or the secondary devices. To make this determination, the device management component 968 may determine a device type of the voice-controlled devices 802 and/or secondary devices, capabilities of the device(s), or the like, potentially as stored in the user registry 922. In some instances, the device management component 968 may determine that a particular device is able to communicate directly with the remote system 210(2) (e.g., over WiFi) and, thus, the device management component 968 may provide the response and/or content directly over a network to the secondary device (potentially via the remote system 210(2)). In another example, the device management component 968 may determine that a particular secondary device is unable to communicate directly with the remote system 210(2), but instead is configured to communicate with a voice-controlled device 802 in its environment over short-range wireless networks. As such, the device management component 968 may provide the supplement content (or information) to the remote system 210(2), which in turn may send this to the voice-controlled device 802, which may send the information over a short-range network to the secondary device.

The memory 258(2) may further include the user registry 922 that includes data regarding user profiles as described herein. The user registry 922 may be located part of, or proximate to, the remote system 210(2), or may otherwise be in communication with various components, for example over the network. The user registry 922 may include a variety of information related to individual users, accounts, etc. that interact with the voice-controlled devices 802, and the remote system 210(2). For illustration, the user registry 922 may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device. Further, the user registry 922 may store indications of associations between various voice-controlled devices 802 and/or secondary device, such as virtual clusters of devices. The user registry 922 may represent clusters of the voice-controlled devices 802 and/or secondary devices as single devices that can receive commands and disperse the commands to each voice-controlled device 802 and/or secondary device in the cluster. In some examples, the virtual cluster of devices may be represented as a single device which is determined as being capable, or not capable (e.g., offline), of performing a command in a speech utterance. A virtual cluster of devices may generally correspond to a stored grouping of devices, or a stored association between a group of devices.

In some examples, the device state for devices associated with a user account may indicate a current state of the device, such as voice-controlled devices 802 and the secondary devices. In this way, the command processor 958 and/or the domain speechlets 962 may determine, based on the stored device states in the user registry 922, a current device state of the voice-controlled devices 802 and/or the secondary devices. Rather than receiving device states for the voice-controlled devices 802, in metadata, the devices states may already have been determined or received and stored in the user registry 922. Further, the user registry 922 may provide indications of various permission levels depending on the user. As an example, the remote system 210(2) may perform speaker recognition on the audio data 902 to determine an identity of the speaker. If the speaker is a child for instance, the child profile may have permission restrictions where they are unable to hang up a phone call of a parent, for example. Conversely, a parent profile may be able to hang up a phone call involving a child profile, or change channel on a television when a child profile is also detected as watching the television.

In some examples, to determine the device state, the event bus 966 may publish different events which indicate device states to various entities or components that subscribe to the event bus 966. For instance, if an event of "set an alarm" occurs for a voice-controlled device 802, the event bus 966 may publish the indication of this event, and thus the device state of an alarm is set for the voice-controlled device 802. Thus, various components, such as the targeting component 920, may be provided with indications of the various device states via the event bus 966. The event bus 966 may further store and/or update device states for the voice-controlled devices 802 in the user registry 922. The components of the remote system 210(2) may query the user registry 922 to determine device states.

A particular user profile may include a variety of data that may be used by the remote system 210(2). For example, a user profile may include information about what voice-controlled device 802 are associated with the user 906. The user profile may further indicate an IP address for each of the devices associated with the user 906, user IDs for each of the devices, indicates of the types of devices, and current device states for the devices.

It is noted that, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:

receiving first data associated with operating a first electronic device in a first state and operating a second electronic device in a second state, wherein the first state is one of a powered-on state or a powered-off state, and wherein the second state is one of a powered-on state or a powered-off state;

causing, based at least in part on receiving the first data, the first electronic device to operate in the first state and the second electronic device to operate in the second state, wherein the first electronic device is expected to operate in the first state over a period of time and the second electronic device is expected to operate in the second state over the period of time;

receiving, within the period of time over which the first electronic device is expected to operate in the first state and the second electronic device is expected to operate in the second state, second data associated with at least one of:

the first electronic device operating in a third state that is the other of the powered-on state or the powered-off state, or the second electronic device operating in a fourth state that is the other of the powered-on state or the powered-off state;

based at least in part on receiving the second data associated with at least one of the first electronic device operating in the third state or the second electronic device operating in the fourth state, generating a notification; and sending third data associated with the notification to a third electronic device to cause the third electronic device to output the notification.

2. The method of claim 1, further comprising:

receiving, from the third electronic device, fourth data associated with operating at least one of the first electronic device in the first state or operating the second electronic device in the third state; and causing, based at least in part on the fourth data, the at least one of the first electronic device to switch from operating in the third state to operating in the first state or the second electronic device to switch from operating in the fourth state to operating in the second state.

3. The method of claim 1, further comprising:

receiving fourth data associated with operating the first electronic device in the third state and the second electronic device in the fourth state; and causing, based at least in part on the fourth data, the first electronic device to operate in the third state and the second electronic device to operate in the fourth state.

4. The method of claim 1, wherein the notification comprises at least one of:

audio data output via a loudspeaker of the third electronic device; or image data output via a display of the third electronic device.

5. The method of claim 1, further comprising receiving third data indicating that user activity was detected within an environment of the first electronic device and the second electronic device, wherein the third data is received from at least one of the first electronic device, the second electronic device, or a fourth electronic device.

6. The method of claim 1, further comprising determining a location of the third electronic device, and wherein at least one of:

causing the first electronic device to operate in the first state and the second electronic device to operate in the second state is based at least in part on the location of the third electronic device;

or generating the notification is based at least in part on the location of the third electronic device.

7. A system comprising:

one or more processors; and one or more computer-readable media storing instructions that, when executed by the one or more processors, cause the one or more processors to perform operations comprising:

determining that a first electronic device within an environment is operating in a first state, wherein the first state is one of a powered-on state or a powered-off state, causing the first electronic device to operate in a second state that is the other of the powered-on state or the powered-off state over a period of time, determining, within the period of time that the first electronic device is expected to operate in the second state, that the first electronic device has switched from operating in the second state to operating in the first state, causing, in response to determining that the first electronic device has switched from operating in the second state to operating in the first state, a second electronic device to switch from operating in a third state to operating in a fourth state, and causing a notification to be presented on a third electronic device regarding whether to operate at least one of the first electronic device in the first state or the second electronic device in the fourth state.

8. The system of claim 7, the operations further comprising determining that at least one of the first electronic device, the second electronic device, or a fourth electronic device detected motion, wherein determining that the first electronic device has switched to operating in the first state is based at least in part on the at least one of the first electronic device, the second electronic device, or the fourth electronic device detecting motion.

9. The system of claim 7, wherein the notification corresponds to a query regarding whether to operate at least one of:

the first electronic device in the first state or the second state; or the second electronic device in the third state or the fourth state.

10. The system of claim 7, the operations further comprising:

receiving, from the third electronic device, data associated with operating the at least one of:

the first electronic device in the second state, or the second electronic device in the fourth state; and causing the at least one of the first electronic device to operate in the second state or the second electronic device to operate in the fourth state.

11. The system of claim 7, the operations further comprising:

receiving first data from the first electronic device; and receiving second data from the first electronic device, wherein:

determining that the first electronic device is operating in the first state is based at least in part on the first data, and determining that the first electronic device has switched from operating in the second state to operating in the first state is based at least in part on the second data.

12. The system of claim 7, further comprising causing a fourth electronic device to switch from operating in a fifth state to operating in a sixth state based at least in part on determining, within the period of time, that the first electronic device has switched from operating in the second state to operating in the first state.

13. The system of claim 7, the operations further comprising:

determining that a threshold amount of time has passed since the notification being presented on the third electronic device;

determining a type of device that is associated with the first electronic device; and causing, after the threshold amount of time and based at least in part on the type of device, the first electronic device to switch from operating in the first state to operating in the second state.

14. A system, comprising:

one or more processors; and one or more computer-readable media storing instructions that, when executed by the one or more processors, cause the one or more processors to perform operations comprising:

storing first data associated with a first electronic device operating in a first state, wherein the first electronic device is expected to operate in the first state over a period of time, and wherein the first state is one of a powered-on state or a powered-off state, receiving second data associated with the first electronic device, determining, based at least in part on the second data, that the first electronic device is operating in a second state within the period of time over which the first electronic device is expected to operate in the first state, wherein the second state is the other of the powered-on state or the powered-off state, based at least in part on determining that the first electronic device is operating in the second state within the period of time over which the first electronic device is expected to operate in the first state:

generating a notification, and causing one or more second electronic devices to operate in a third state, and causing the notification to be sent to a third electronic device to cause the third electronic device to output the notification.

15. The system of claim 14, wherein the notification comprises at least one of:

audio data output via a loudspeaker of the third electronic device; or image data output via a display of the third electronic device.

16. The system of claim 14, further comprising:

receiving, from the third electronic device, third data associated with operating the first electronic device in the first state; and in response to receiving the third data, causing at least one of:

the first electronic device to switch from operating in the second state to operating in the first state, or the one or more second electronic devices to switch from operating in the third state to operating in a fourth state.

17. The system of claim 14, further comprising:

receiving, from the third electronic device, third data associated with operating the first electronic device in the second state; and in response to receiving the third data, causing at least one of:

the first electronic device to remain operating in the second state, or the one or more second electronic devices to remain operating in the third state.

18. The system of claim 14, further comprising receiving fourth data associated with detecting motion within an environment of the first electronic device, and wherein the first electronic device is configured to switch from operating in the first state to operating in the second state based at least in part on the motion being detected.

19. The system of claim 14, further comprising receiving, from at least one of the first electronic device or the one or more second electronic devices, third data associated with at least one of:

operating the first electronic device in the first state, or operating the one or more second electronic devices in the third state.

20. The system of claim 14, further comprising receiving third data associated with a location of the third electronic device, and wherein storing first data associated with the first electronic device operating in the first state is based at least in part on receiving the third data.

* * * * *